(12) United States Patent
Ronchini Ximenes et al.

(10) Patent No.: US 12,356,088 B2
(45) Date of Patent: Jul. 8, 2025

(54) MULTIMODE DETECTOR FOR DIFFERENT TIME-OF-FLIGHT BASED DEPTH SENSING MODALITIES

(71) Applicant: META PLATFORMS TECHNOLOGIES, LLC, Menlo Park, CA (US)

(72) Inventors: Augusto Ronchini Ximenes, Seattle, WA (US); Michael Hall, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 516 days.

(21) Appl. No.: 17/824,719

(22) Filed: May 25, 2022

(65) Prior Publication Data

US 2022/0294998 A1 Sep. 15, 2022

Related U.S. Application Data

(63) Continuation-in-part of application No. 17/138,537, filed on Dec. 30, 2020, now Pat. No. 11,480,684.

(Continued)

(51) Int. Cl.
*H04N 25/42* (2023.01)
*G01S 7/4863* (2020.01)
(Continued)

(52) U.S. Cl.
CPC ........... *H04N 25/42* (2023.01); *G01S 7/4863* (2013.01); *G01S 7/4865* (2013.01); *G01S 17/894* (2020.01);
(Continued)

(58) Field of Classification Search
CPC ........ H04N 25/42; H04N 25/46; H04N 25/50; H04N 25/705; H04N 25/75; H04N 25/77;
(Continued)

(56) References Cited

U.S. PATENT DOCUMENTS 8,605,853 B2 12/2013 Schultz et al.
8,917,388 B2 12/2014 Tenhunen et al.
(Continued)

FOREIGN PATENT DOCUMENTS

EP 3316497 A1 * 5/2018 ............. H04B 10/11
EP 3451023 A1 * 3/2019 ........... G01S 17/894

OTHER PUBLICATIONS

Cashman E., "The Engineering Essentials Behind LiDAR," Electronic Design, Apr. 9, 2021, 13 pages, Retrieved from the Internet: URL: https://www.electronicdesign.com/markets/automotive/article/21160813/on-semiconductor-the-engineering-essentials-behind-lidar.

(Continued)

*Primary Examiner* — Twyler L Haskins
*Assistant Examiner* — John H Morehead, III
(74) *Attorney, Agent, or Firm* — Freestone Intellectual Property Law PLLC; Aaron J. Visbeek

(57) ABSTRACT

A depth camera assembly (DCA) for multimode time-of-flight based depth sensing is presented herein. The DCA includes a projector, a detector, and a controller. The projector illuminates a target area with outgoing light comprising a plurality of light pulses. The detector includes an array of unit cells. Each unit cell includes a macropixel with a plurality of pixels that captures portions of the outgoing light reflected from the target area, and an array of memory cells coupled to the macropixel. At least one of the memory cells stores information about the captured portions of the reflected outgoing light received from the macropixel. The controller determines depth information for the target area based in part on data read from the at least one memory cell.

19 Claims, 19 Drawing Sheets

Related U.S. Application Data

(60) Provisional application No. 63/291,175, filed on Dec. 17, 2021, provisional application No. 63/040,822, filed on Jun. 18, 2020, provisional application No. 63/040,819, filed on Jun. 18, 2020.

(51) Int. Cl.
  *G01S 7/4865* (2020.01)
  *G01S 17/894* (2020.01)
  *H04N 25/46* (2023.01)
  *H04N 25/705* (2023.01)
  *H04N 25/77* (2023.01)

(52) U.S. Cl.
  CPC .......... *H04N 25/46* (2023.01); *H04N 25/705* (2023.01); *H04N 25/77* (2023.01)

(58) Field of Classification Search
  CPC .... G01S 7/4863; G01S 7/4865; G01S 17/894; G01S 7/4868; G01S 7/487
  See application file for complete search history.

(56) References Cited

U.S. PATENT DOCUMENTS

| | | | |
|---|---|---|---|
| 10,097,264 B2 | 10/2018 | Venugopalan et al. | |
| 10,116,925 B1 | 10/2018 | Wang et al. | |
| 10,397,554 B2 | 8/2019 | Wang | |
| 10,554,881 B2 | 2/2020 | Price et al. | |
| 10,714,520 B1* | 7/2020 | Liu | H10F 39/807 |
| 10,845,308 B2* | 11/2020 | Rothberg | H10F 39/014 |
| 10,929,997 B1* | 2/2021 | Hall | G06T 7/97 |
| 10,931,905 B2 | 2/2021 | Jin et al. | |
| 11,196,229 B2 | 12/2021 | Lee et al. | |
| 11,236,993 B1* | 2/2022 | Hall | G01S 7/4865 |
| 2013/0003911 A1* | 1/2013 | Schultz | H04N 25/772 |
| | | | 377/54 |
| 2013/0116049 A1* | 5/2013 | Pellman | A63F 13/42 |
| | | | 348/46 |
| 2014/0028883 A1* | 1/2014 | Shin | H04N 25/78 |
| | | | 348/297 |
| 2014/0240492 A1* | 8/2014 | Lee | H04N 25/53 |
| | | | 348/136 |
| 2016/0041264 A1* | 2/2016 | Dielacher | G01S 17/894 |
| | | | 356/5.01 |
| 2016/0054447 A1 | 2/2016 | Sun et al. | |
| 2017/0180658 A1* | 6/2017 | Choi | G01S 7/497 |
| 2018/0115364 A1* | 4/2018 | Venugopalan Nair Jalakumari | H04B 10/116 |
| 2018/0160041 A1* | 6/2018 | Price | G02B 19/009 |
| 2018/0323788 A1* | 11/2018 | Rae | H03K 19/20 |
| 2018/0338127 A1 | 11/2018 | Wang et al. | |
| 2019/0174120 A1* | 6/2019 | Wang | H04N 25/77 |
| 2019/0208150 A1* | 7/2019 | Jin | G01S 17/36 |
| 2019/0235351 A1* | 8/2019 | Lee | H05K 1/181 |
| 2019/0393674 A1 | 12/2019 | Lee et al. | |
| 2020/0036944 A1* | 1/2020 | Zhu | H04N 7/0806 |
| 2020/0386890 A1 | 12/2020 | Oggier et al. | |
| 2021/0181316 A1 | 6/2021 | Zhu et al. | |
| 2021/0396886 A1 | 12/2021 | Ronchini Ximenes et al. | |
| 2022/0018941 A1* | 1/2022 | Druml | G01S 7/4863 |

OTHER PUBLICATIONS

International Search Report and Written Opinion for International Application No. PCT/US2021/033023, mailed Aug. 3, 2021, 13 Pages.

Non-Final Office Action mailed Jul. 27, 2022 for U.S. Appl. No. 16/838,691, filed Apr. 2, 2020, 14 pages.

Onsemi., "SiPMs in Direct ToF Ranging Applications," White Paper, Semiconductor Components Industries, LLC, Aug. 2021, 17 pages, Retrieved from the Internet: URL: https://www.onsemi.com/pub/Collateral/TND6254-D.PDF?utm_source=blog&utm_medium=blog&utm_campaign=lidar-rangefinder&utm_content=link-tnd6254.

Zhang C., et al., "A 240×160 3D-Stacked SPAD dToF Image Sensor With Rolling Shutter and In-Pixel Histogram for Mobile Devices," IEEE Open Journal of the Solid-State Circuits Society, Oct. 8, 2021, vol. 22, pp. 3-11, Retrieved from the Internet: URL: https://ieeexplore.ieee.org/document/9565145.

International Preliminary Report on Patentability for International Application No. PCT/US2021/033023, mailed Dec. 29, 2022, 10 pages.

* cited by examiner

1420

1430

MULTIMODE DETECTOR FOR DIFFERENT TIME-OF-FLIGHT BASED DEPTH SENSING MODALITIES

CROSS-REFERENCE TO RELATED APPLICATIONS

This application is a continuation-in-part of U.S. patent application Ser. No. 17/138,537 filed Dec. 30, 2020, which claims benefit of U.S. Provisional Patent Application Ser. No. 63/040,819 filed Jun. 18, 2020 and U.S. Provisional Patent Application Ser. No. 63/040,822 filed Jun. 18, 2020, each of which is hereby incorporated by reference in its entirety. This application claims benefit of U.S. Provisional Patent Application Ser. No. 63/291,175 filed Dec. 17, 2021, which is hereby incorporated by reference in its entirety.

TECHNICAL FIELD

The present disclosure generally relates to depth sensing, and specifically relates to a multimode detector for different time-of-flight based depth sensing modalities.

BACKGROUND

In augmented reality (AR), digital content placed in a user's environment must interact realistically with physical objects and surfaces. For example, if part of a virtual object is behind a real object, the occlusion should be quickly detected so the part of the virtual object can be masked from rendering on the user's display. In those cases, sparse depth estimation is still used to inform the object detection models and to initialize and update the scene model.

Mapping an environment with high accuracy and resolution allows generation or more immersive virtual reality (VR) or AR content. Accurately mapping an environment surrounding a VR system or an AR system allows virtual objects to more realistically interact with real objects the environment surrounding the VR or AR system. For example, highly accurate mapping of an environment surrounding the VR or AR system allows a virtual object in a virtual environment to collide with real surfaces in the environment surrounding the VR or AR system or to appear occluded when the virtual object moves behind an opaque surface in the environment surrounding the VR or AR system. As another example, accurate mapping of an environment surrounding a VR or AR system allows virtual, or digital, objects placed in a user's environment to more realistically interact with physical objects or surfaces in the user's environment; for example, if a virtual object is behind a physical object, rapid detection of the occlusion of the virtual object by the physical object allows the VR or AR system to mask rendering of the virtual object that is behind the physical object.

For AR applications, a very wide range of scene conditions are possible, as a combination of target reflectivity, distance, and ambient light. In an active depth sensing system, such as a time-of-flight based depth sensing system, a complex operation between a projector (e.g., an array of lasers) and a detector is typically required. Inevitably, designing a depth sensing system that can operate at the most stringent conditions, such as maximum ambient light, lowest reflectivity, and furthest distance, would lead to excessive power consumption. A dynamic multimode operation of a depth sensing system, capable of operating optimally at each pixel of the detector, may be helpful in staying within a predetermined power envelope.

SUMMARY

A depth camera assembly (DCA) determines depth information for one or more objects in a local area surrounding the DCA. In various embodiments, the DCA is included in a head mounted display (HMD) of a virtual reality system or of an augmented reality system. The DCA includes an illumination source, an imaging device, and a controller in various embodiments. In other embodiments, the DCA is a separate device detached from the HMD.

To accurately map an environment surrounding a virtual reality (VR) system or an augmented reality (AR) system, the VR system or AR system includes a depth camera. For inclusion in a head mounted display of a VR system or an AR system, such as depth camera should have a small form factor and low power consumption. Conventional depth cameras use structured light, which projects known patterns into the environment surrounding a depth camera, or indirect time of flight, which indirectly measures a round trip travel time of light projected into the environment surrounding the depth camera and returning to pixels on a sensor array based on a phase delay of an illumination pattern, such as a continuous wave illumination pattern or a pulsed illumination pattern, projected into the environment surrounding the depth camera.

Direct time-of-flight (dToF) depth sensing configurations measure a roundtrip travel time of photons generated by multiple short pulses of light from an illumination source and synchronized with a detector. In many direct time-of-flight configurations, single-photon detectors are used, such as single-photon avalanche diodes (SPADs) are used. The depth to an object, or half of the travel distance, can then be extracted from the speed of light ($c \approx 3 \cdot 10^8$ m/s), according to $d = c/2 \cdot \tau$, where $\tau$ is the travel time. Direct time-of-flight allows multiple events (e.g., detections of photons) to be acquired in a histogram through a process called time-correlated single-photon counting (TCSPC), where the returning signal is timestamped and accumulated around an accumulation bin coupled to detectors in a location corresponding to a target location ($\tau_{target}$, target), while noise from internal and background illumination noise is uniformly distributed over the measurement range, allowing depth estimation under low signal to noise conditions.

To determine depth information, a sparse active depth system comprises a console coupled to a HMD and a DCA included in the HMD. Additionally, the HMD includes an electronic display element configured to display content to the user. In various embodiments, the DCA includes an illumination source comprising multiple addressable illumination blocks, allowing selection of individual illumination blocks. Each illumination block includes one or more emitters configured to emit light. For example, each illumination block includes one or more vertical-cavity surface-emitting lasers (VCSELs). In some embodiments, each illumination block includes nine VCSELs arranged in a three by three grid; however, in other embodiments, illumination blocks may include any suitable number of emitters having any suitable arrangement relative to each other. Through addressing logic, each emitter may be individually activated to emit light; alternatively, a group of emitters are activated via the addressing logic. The illumination source is configured so each emitter emits a single dot into an area surrounding the DCA in some embodiments. Alternatively, each emitter includes a diffractive optical element (DOE), so an emitter emits multiple points into the area surrounding the DCA; for example, an emitter includes a VCSELs and a 2×2 tiler DOE configured to the emitter emits four dots into the area surrounding the DCA when activated. However, in other embodiments, an emitter may be configured to emit any suitable number of dots into the area surrounding the DCA when activated. The addressable illumination source may be activated when the HMD is in a local area that the HMD has not previously been in or when a dynamic object moves into a field of view of the HMD while a virtual object is being rendered.

In various embodiments, the illumination source includes a lens or other optical element positioned so light from the emitters pass through the lens or other optical element before reaching the local area. The lens or other optical element defocuses light from the emitters. By defocusing light from emitters, the illumination source causes light from the emitters to be incident on a larger number of pixels of a detector included in the imaging device. This increases a probability of the detector detecting light from the illumination source that was reflected by one or more objects in the area surrounding the DCA.

In conventional detectors for DCAs, a detector is read at a fixed frame rate. However, in direct time of flight configurations reading the detector data at the fixed frame rate causes high activity pixels in the sensor to be read less often, which may cause low quality depth reconstruction from information about photon detections by the high activity pixels that does not fully account for numbers of photon detection by the high activity pixels. Further, reading detector data at the fixed frame rate in direct time of flight implementations causes data from low activity pixels to be obtained more frequently, which may result in older photon detections to be identified multiple times.

To more efficiently obtain data from a detector of active depth sensor, the DCA includes an imaging device that is configured to capture, in accordance with receiving instructions from the controller, one or more images of the local area including reflected light including portions of light emitted by the addressable illumination source reflected from objects in the local area. The reflected light captured by the active depth sensor is reflected from the one or more objects in the local area. In various embodiments, detector comprises a two-dimensional array of pixels. However, in other embodiments, the active depth sensor includes a single detector or multiple detectors positioned relative to each other (e.g., a line of detectors). In various embodiments, each pixel includes a SPAD. Pixels of the detector are grouped into macropixels including a number of rows of pixels and a number of columns of pixels. In some embodiments, a macropixel includes an equal number of rows of pixels and columns of pixels. For example, a macropixel includes 16 rows of pixels and 16 columns of pixels, so the macropixel includes 256 pixels. However, in other embodiments, a macropixel includes any number of rows of pixels and columns of pixels. In some embodiments, each macropixel of the detector includes a common number of rows of pixels and includes a common number of columns of pixels.

Hence, in various embodiments, the detector includes an array of macropixels. Each macropixel comprises a plurality of pixels configured to capture light from the local area surrounding the detector. In some embodiments, each pixel in a macropixel is coupled to a time to digital converter (TDC) that is configured to generate a digital timestamp signal when the pixel coupled to the TDC captured light from the local area. In other embodiments, a plurality of pixels in a macropixel are configured to operate in parallel to generate multiple digital timestamps from an array of TDCs coupled to pixels of the plurality in sequence. One or more output buses coupled to various macropixels receive data from TDCs included in various macropixels. Based on one or more control signals, a macropixel of the array is selected. The detector may internally generate the control signals or receive the control signals form an external source, such as the console. One or more output buses coupled to the selected macropixel are configured to receive data from TDCs coupled to pixels included in the selected macropixel.

The plurality of macropixels may each include one or more pixels having a charge based memory element. This allows a pixel to store a count of photon detection events captured by a pixel. Charge based memory elements in multiple pixels may be arranged into an array that is accessed by a timing reference that is synchronized with emission of light by the illumination source. Each phase of the timing reference addresses a charge based memory element included in a pixel, representing a bin for a histogram of photon detection events by the pixel. Multiple pixels of a macropixel operate in parallel, with photon detection events stored in charge based memory elements included in different pixels used to generate a histogram of photon detection events by pixels of the macropixel, with the timing reference providing timing information for the photon detection events stored in different charge based memory elements. Using a charge based memory element in each pixel allows for compact storage of photon detection events by a pixel, enabling overall dimensions of the detector to remain compact. Example charged based memory elements include a charge-sharing memory element and a charge pump memory element.

To decrease power consumption, when pixels of the detector include a charge based memory element, the detector in the imaging device uses a timing reference included in different macropixels of the detector, rather than time to digital converters (TDCs) coupled to different pixels to determine a histogram of photon detection by pixels. When using the timing reference, a row decoder is coupled to each memory element included in a macropixel of the detector. For example, the row decoded is coupled to each pixel including a memory element in the macropixel of the detector. The row decoder may be any suitable device providing a reference timing signal, such as a voltage controlled oscillator (VCO). Additionally, a column decoder is also coupled to each memory element included in the macropixel of the detector; for example, the column decoder is coupled to each pixel of the macropixel including a memory element. In various embodiments, the column decoder is a counter also coupled to the row decoder. For example, the column decoder is a shift register coupled to the row decoder, so the column decoder is incremented during each period of the row decoder. The row decoder and column decoder in combination select a specific memory element corresponding to a row and a column in the macropixel that is incremented when the macropixel detects light emitted by the addressable illumination source.

In various embodiments, the addressable illumination source and the active depth sensor are configured so an emitter of the addressable illumination source is match to a corresponding macropixel of the detector of the active depth sensor. This allows each macropixel of the detector to make a single direct time of flight depth measurement in combination with the corresponding emitter of the addressable illumination source. The number of dots emitted by the addressable illumination source specify the spatial resolution, allowing for super-resolution of depth if multiple dot patterns are used by the emitters or if a beam scanner is used by the addressable illumination source.

The DCA also includes an addressable depth sensor, which may be activated when the HMD is in a local area that the HMD has not previously been in or when a dynamic object moves into a field of view of the HMD while a virtual object is being rendered. Data from the addressable depth sensor is processed the sensor to yield high fidelity sparse depth.

This information is used to update or to add to an existing model of the local area surrounding the HMD, such as a model stored by the console, which reduces future reliance on the sparse active depth system. When an object moves through the field of view of the HMD, the sparse active depth sensor is active to provide absolute scale for object detection masks (such as hands and bodies) and/or be upsampled via a higher resolution 2-dimensional image in preparation for use as a dynamic occlusion mask. When a suitably completed model of the local area is constructed (or available from prior models), the model can be used instead of the real-time depth system while the local area surrounding the HMD remains static. In some embodiments, a scene detection loop may be used to evaluate whether a current view of the local area surrounding the HMD has at least a threshold amount of differences from a stored model of the local area surrounding the HMD. In response to determining the local area has at least the threshold amount of differences from the stored model of the local area, an activation map is generated by the console and used to control the addressable illumination source and the addressable depth sensor. In some embodiments, the DCA includes a 2 dimensional camera capturing images of the local area surrounding the HMD that are used to detect changes in the local area surrounding the DCA. The 2-dimensional camera is a grayscale or a RGB camera that captures images of the local area surrounding the HMD. The 2-dimensional camera may capture images of the local area at different frame rates in some embodiments. For example, the 2-dimensional camera captures images of the local area at a relatively low frame rate (e.g., 10 frames per second), and captures images at a higher frame rate for generating an occlusion mask of the local area surrounding the HMD. The occlusion mask is a 2-dimensional mask identifying areas of the electronic display where virtual content is shown, or areas of the electronic display where virtual content is not shown. The occlusion mask depends on a view of the local area surrounding the HMD, so different occlusion masks for the local area are maintained corresponding to different locations within the local area.

Images captured by the 2-dimensional camera may be provided to the console, which identifies regions in the captured images including changes from prior images or from a stored model of the local area surrounding the HMD. Based on the identified regions, the console generates an activation map that activates portions of the addressable illumination source and portions of the addressable depth sensor corresponding to the identified regions.

Embodiments presented herein are further directed to a DCA configured for multimode time-of-flight based depth sensing. The DCA includes a projector, a detector, and a controller. The projector illuminates a target area with outgoing light comprising a plurality of light pulses. The detector includes an array of unit cells. Each unit cell includes a macropixel with a plurality of pixels that captures portions of the outgoing light reflected from the target area, and an array of memory cells coupled to the macropixel. Each memory cell in the array stores corresponding captured photon information related to a corresponding portion of the captured reflected light (i.e., captured photons) received by the macropixel. The controller determines depth information for the target area based in part on data read from the array of memory cell, e.g., by locating a concentration of the captured photon information in at least one of the memory cells.

Embodiments presented herein further relate to a process of optimizing the number of light pulses emitted from a projector of a DCA. The projector illuminates a target area with a plurality of light pulses emitted from an array of light emitters. Each light emitter in the array of light emitters outputs a corresponding number of light pulses to a respective portion of the target area. A detector of the DCA detects, via an array of macropixels, portions of the light pulses reflected from the target area. Each macropixel in the array captures light over one or more respective timing windows from one or more different light emitters of the array of light emitters. A controller of the DCA estimates a respective signal-to-noise ratio (SNR) for each macropixel in the array, thus obtaining a set of SNRs for the array of macropixels. The controller updates the number of light pulses for at least one of the light emitters and a timing window for at least one of the macropixels, based on the estimated SNRs. The projector illuminates, via the array of light emitters, the target area with a second set of light pulses in accordance with the updated number of light pulses. The at least one light emitter may output the updated number of light pulses. The detector detects, via the array of macropixels, the second set of light pulses reflected from the target area. The at least one macropixel may capture light over a different timing window. The controller determines depth information for the target area based in part on the detected second set of light pulses.

Figure 1:
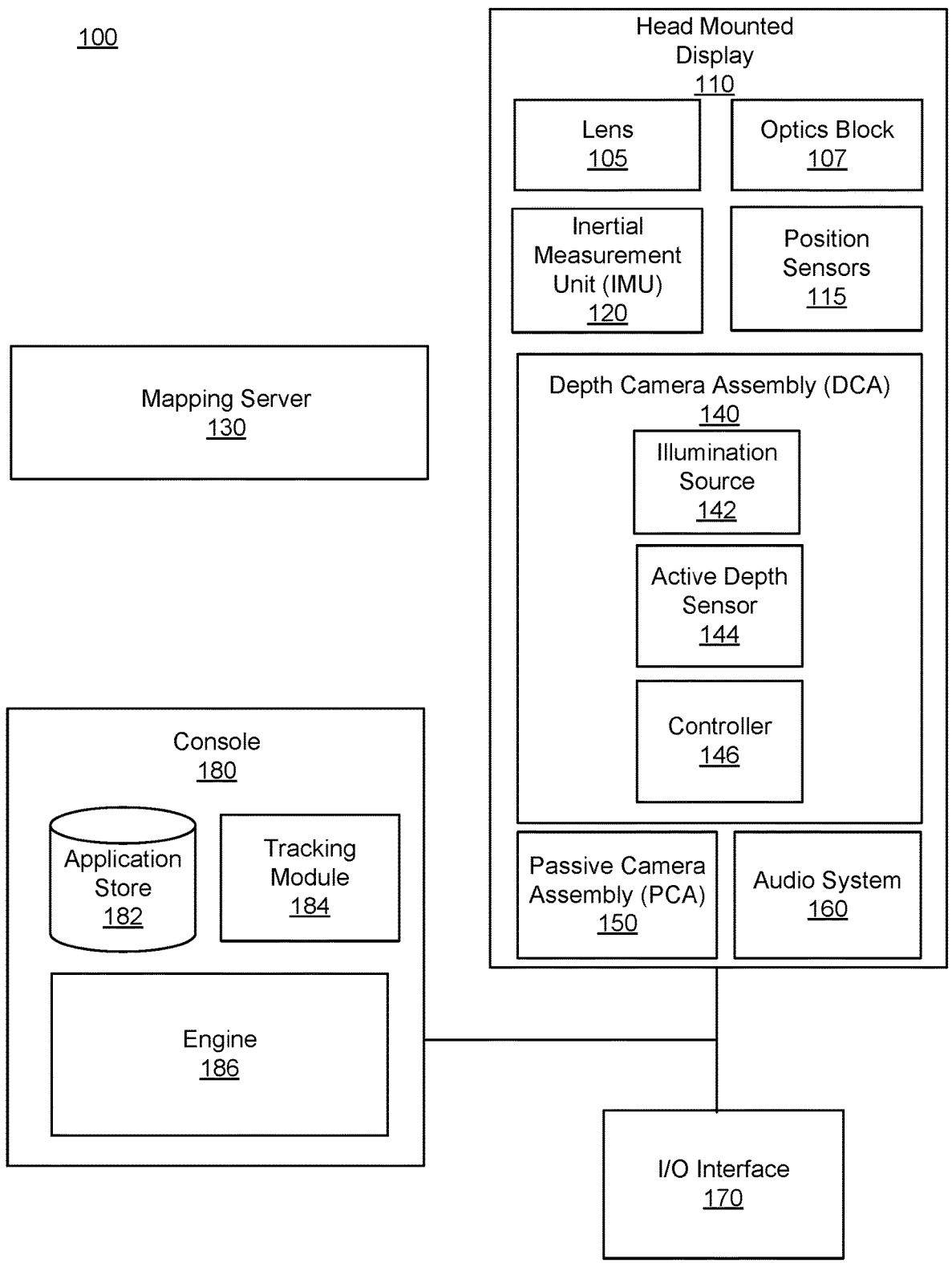
FIG. 1 is a block diagram of a system environment in which a console and a head mounted display (HMD) operate, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

Some embodiments of the present disclosure relate to a depth camera assembly (DCA) that includes a multimode detector that can be configured for different time-of-flight (ToF) based depth sensing modalities. The multimode detector may include an array of unit cells. Each unit cell includes a macropixel composed of multiple pixels, and each pixel including a charge based memory element configured to store information identifying an amount of light being captured after reflection from a specific portion of a target area. Each unit cell further includes an array of memory cells coupled to the macropixel for storage of information about the captured light reflected from the target area received from the macropixel. The detector may further include a column decoder and a row decoder for accessing one or more memory cells in the array of memory cells. By activating/deactivating the column decoder and the row decoder, the unit cells (and the detector) can operate in a direct time-of-flight (dToF) mode, an indirect time-of-flight (iToF) mode, or in a photon counting mode. To operate in the dToF mode, both column and row decoders are used for accessing the array of memory cells. By deactivating the column decoder or the row decoder, the unit cell (and the detector) operates in the iToF mode. By deactivating both column and row decoders, the unit cell (and the detector) operates as a photon counter. More details about a structure and different operational modes of the multimode detector are provided below in relation to FIG. 11, FIGS. 12A-12C and FIG. 13.

Portions of a target area that are close to a DCA may saturate corresponding pixels on a detector of the DCA, whereas as distance increases the potential for saturation reduces. Thus, instead of having uniform binning in time for capturing light signals at the detector, the number of bins may be increased (i.e., the bins may be shorter in time) for near distance capturing relative to the number of bins used for farther distances. In this way, saturation at the detector can be mitigated or avoided. More details about depth sensing with variable bin widths are provided below in relation to FIGS. 14A-14C and FIGS. 15A-15C.

In some other embodiments, the number of light pulses emitted from a projector of a DCA to a target area can be optimized to avoid saturation at a detector of the DCA. The projector may include a plurality of lasers (e.g., an array of vertical-cavity surface-emitting lasers (VCSELs)). For example, there can be one laser (e.g., one VCSEL) for each pixel at the detector. The projector may start the light emission with some predetermined maximum (or otherwise high) level of light pulses. The projector (e.g., via the plurality of lasers) may illuminate the target area with the initial set of light pulses. A controller of the DCA may determine which pixels of the detector (or equivalently which portions of the target area) are saturated. After that, the controller may selectively reduce the amount of light signals in the saturated portions of the target area by reducing the number of light pulses emitted from corresponding lasers of the projector and/or reducing how long the saturated pixels in the detector are active. This process may be repeated until a predetermined level of signal-tonoise ratio (SNR) is achieved for each pixel of the detector. More details about a process of optimizing the number of light pulses emitted from the projector of the DCA are provided below in relation to FIGS. 16A-16B and FIG. 17.

In some embodiments, a headset can integrate the DCA presented herein. The headset may further include a display and an optical assembly. The headset may be part of an artificial reality system. The display may be configured to emit image light. The optical assembly may be configured to direct the image light to an eye-box of the headset corresponding to a location of a user's eye. The image light may comprise depth information for the target area determined by the DCA. In one embodiment, the headset is implemented as an eyeglass-type platform representing a NED. In another embodiment, the headset is implemented as a HMD.

System Environment

FIG. 1 is a block diagram of one embodiment of a system environment 100 of a HMD 110. The system environment 100 may operate in an artificial reality environment, e.g., a virtual reality, an augmented reality, a mixed reality environment, or some combination thereof. The system 100 environment shown by FIG. 1 includes the HMD 110, a mapping server 130 and an input/output (I/O) interface 170 that is coupled to a console 180. While FIG. 1 shows an example system environment 100 including one HMD 110 and one I/O interface 180, in other embodiments any number of these components may be included in the system environment 100. For example, there may be multiple headsets 110 each having an associated I/O interface 170, with each HMD 110 and I/O interface 170 communicating with the console 180. In alternative configurations, different and/or additional components may be included in the system environment 100. Additionally, functionality described in conjunction with one or more of the components shown in FIG. 1 may be distributed among the components in a different manner than described in conjunction with FIG. 1 in some embodiments. For example, some or all of the functionality of the console 180 may be provided by the HMD 110.

The HMD 110 includes a lens 105, an optics block 107, one or more position sensors 115, an inertial measurement unit (IMU) 120, a depth camera assembly (DCA) 140 a passive camera assembly (PCA) 150, and an audio system 160. Some embodiments of the HMD 110 have different components than those described in conjunction with FIG. 1. Additionally, the functionality provided by various components described in conjunction with FIG. 1 may be differently distributed among the components of the HMD 110 in other embodiments or may be captured in separate assemblies remote from the HMD 110.

The lens 105 may include an electronic display that displays 2D or 3D images to the user in accordance with data received from the console 180. In various embodiments, the lens 105 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 107 magnifies image light received from the electronic display, corrects optical errors associated with the image light, and presents the corrected image light to a user of the HMD 110. In various embodiments, the optics block 107 includes one or more optical elements. Example optical elements included in the optics block 107 include: an aperture, a Fresnel lens, a convex lens, a concave lens, a filter, a reflecting surface, or any other suitable optical element that affects image light. Moreover, the optics block 107 may include combinations of different optical elements. In some embodiments, one or more of the optical elements in the optics block 107 may have one or more coatings, such as partially reflective or anti-reflective coatings.

Magnification and focusing of the image light by the optics block 107 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 107 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 107 corrects the distortion when it receives image light from the electronic display generated based on the content.

The IMU 120 is an electronic device that generates data indicating a position of the HMD 110 based on measurement signals received from one or more of the position sensors 115. A position sensor 115 generates one or more measurement signals in response to motion of the HMD 110. Examples of position sensors 115 include: one or more accelerometers, one or more gyroscopes, one or more magnetometers, another suitable type of sensor that detects motion, a type of sensor used for error correction of the IMU 120, or some combination thereof. The position sensors 115 may be located external to the IMU 120, internal to the IMU 120, or some combination thereof.

The DCA 140 generates depth image data of a local area, such as a room. Depth image data includes pixel values defining distance from the DCA 140, providing a mapping of locations captured in the depth image data, such as a three-dimensional mapping of locations captured in the depth image data. The DCA 140 includes an illumination source 142, an active depth sensor 144, and a controller 146. The illumination source 142 may project a structured light pattern or other light that is reflected off objects in the local area, and captured by the active depth sensor 144 or by the additional imaging device 146 to generate the depth image data.

For example, the illumination source 142 may project a plurality of structured light (SL) elements of different types (e.g., lines, grids, or dots) onto a portion of a local area surrounding the HMD 110. In various embodiments, the illumination source 142 comprises an emitter and a pattern plate. The emitter is configured to illuminate the pattern plate with light (e.g., infrared light). The illuminated pattern plate projects a structured light (SL) pattern comprising a plurality of SL elements into the local area. For example, each of the SL elements projected by the illuminated pattern plate is a dot associated with a particular location on the pattern plate.

Each SL element projected by the DCA 140 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 140 deforms as it encounters various surfaces and objects in the local area. The active depth sensor 144 is configured to capture one or more images of the local area. Each of the one or more images captured may include a plurality of SL elements (e.g., dots) projected by the illumination source 142 and reflected by the objects in the local area. The active depth sensor 144 may be a detector array, a camera, or a video camera.

The active depth sensor 144 includes a detector, as further described below in conjunction with FIGS. 5-11. In various embodiments, the detector includes circuitry that performs time gating on pixels of the detector to disable detection events away from a target location in the local area from which light from the illumination source 142 is reflected in the local area. This selective disabling of pixels of the detector reduces an amount of background light (i.e., detected light that is not emitted by the illumination source 142). Including circuitry in the detector, as further described below in conjunction with FIGS. 6-10, reduces power consumption by the active depth sensor 144 and increases a signal to noise ratio of timing information describing capture of light emitted by the illumination source 142, reflected by one or more objects in the local area, and captured by the active depth sensor 144.

The controller of the DCA 140 is coupled to the illumination source 142 and to the active depth sensor 144 and is configured to generate emission instructions for the illumination source 142. The controller of the DCA 140 provides the emission instructions components of the illumination source 142 to direct light emitted by the illumination source 142. Additionally, the controller 146 receives information from the active depth sensor 144 identifying a digital timestamp when the active depth sensor 144 detected light from the illumination source 142 reflected by one or more objects in the local area. From the digital timestamp and a time when the illumination source 142 emitted light into the local area, the controller 146 determines a distance from the DCA 140 to objects in the local area. In some embodiments, the DCA 140 identifies an object, or other target, in the local area and provides control signals to the active depth sensor 144 that identify time intervals when the active depth sensor 144 determines digital timestamps for detected light, as further described below in conjunction with FIGS. 6-8.

The PCA 150 includes one or more passive cameras that generate color (e.g., RGB) image data. Unlike the DCA 140 that uses active light emission and reflection, the PCA 150 captures light from the environment of a local area to generate image data. Rather than pixel values defining depth or distance from the imaging device, the pixel values of the image data may define the visible color of objects captured in the imaging data. In some embodiments, the PCA 150 includes a controller that generates the color image data based on light captured by the passive imaging device. In some embodiments, the DCA 140 and the PCA 150 share a common controller. For example, the common controller may map each of the one or more images captured in the visible spectrum (e.g., image data) and in the infrared spectrum (e.g., depth image data) to each other. In one or more embodiments, the common controller is configured to, additionally or alternatively, provide the one or more images of the local area to the audio system 160, to the console 180, or to any other suitable components.

The audio system 160 presents audio content to a user of the HMD 110 using a set of acoustic parameters representing an acoustic property of a local area where the HMD 110 is located. The audio system 160 presents the audio content to appear originating from an object (e.g., virtual object or real object) within the local area. The audio system 160 may obtain information describing at least a portion of the local area. In some embodiments, the audio system 160 may communicate the information to the mapping server 130 for determination of the set of acoustic parameters at the mapping server 130. The audio system 160 may also receive the set of acoustic parameters from the mapping server 130.

In some embodiments, the audio system 160 selectively extrapolates the set of acoustic parameters into an adjusted set of acoustic parameters representing a reconstructed impulse response for a specific configuration of the local area, responsive to a change of an acoustic condition of the local area being above a threshold change. The audio system 160 may present audio content to the user of the HMD 110 based at least in part on the reconstructed impulse response.

In some embodiments, the audio system 160 monitors sound in the local area and generates a corresponding audio stream. The audio system 160 may adjust the set of acoustic parameters, based at least in part on the audio stream. The audio system 160 may also selectively communicate the audio stream to the mapping server 130 for updating a virtual model describing a variety of physical spaces and acoustic properties of those spaces, responsive to determination that a change of an acoustic property of the local area over time is above a threshold change. The audio system 160 of the HMD 110 and the mapping server 130 may communicate via a wired or wireless communication channel.

The I/O interface 170 is a device that allows a user to send action requests and receive responses from the console 180. An action request is a request to perform a particular action. For example, an action request may be an instruction to start or end capture of image or video data, or an instruction to perform a particular action within an application. The I/O interface 170 may include one or more input devices. Example input devices include: a keyboard, a mouse, a game controller, or any other suitable device for receiving action requests and communicating the action requests to the console 180. An action request received by the I/O interface 170 is communicated to the console 180, which performs an action corresponding to the action request. In some embodiments, the I/O interface 170 includes the IMU 120, as further described above, that captures calibration data indicating an estimated position of the I/O interface 170 relative to an initial position of the I/O interface 170. In some embodiments, the I/O interface 170 may provide haptic feedback to the user in accordance with instructions received from the console 180. For example, haptic feedback is provided when an action request is received, or the console 180 communicates instructions to the I/O interface 170 causing the I/O interface 170 to generate haptic feedback when the console 180 performs an action.

The console 180 provides content to the HMD 110 for processing in accordance with information received from one or more of: the DCA 140, the PCA 150, the HMD 110, and the I/O interface 170. In the example shown in FIG. 1, the console 180 includes an application store 182, a tracking module 184, and an engine 186. Some embodiments of the console 180 have different modules or components than those described in conjunction with FIG. 1. Similarly, the functions further described below may be distributed among components of the console 180 in a different manner than described in conjunction with FIG. 1. In some embodiments, the functionality discussed herein with respect to the console 180 may be implemented in the HMD 110, or a remote system.

The application store 182 stores one or more applications for execution by the console 180. An application is a group of instructions, that when executed by a processor, generates content for presentation to the user. Content generated by an application may be in response to inputs received from the user via movement of the HMD 110 or the I/O interface 170. Examples of applications include: gaming applications, conferencing applications, video playback applications, or other suitable applications.

The tracking module 184 calibrates the local area of the system environment 100 using one or more calibration parameters and may adjust one or more calibration parameters to reduce error in determination of the position of the HMD 110 or of the I/O interface 170. For example, the tracking module 184 communicates a calibration parameter to the DCA 140 to adjust the focus of the DCA 140 to more accurately determine positions of SL elements captured by the DCA 140. Calibration performed by the tracking module 184 also accounts for information received from the IMU 120 in the HMD 110 and/or an IMU 120 included in the I/O interface 640. Additionally, if tracking of the HMD 110 is lost (e.g., the DCA 140 loses line of sight of at least a threshold number of the projected SL elements), the tracking module 184 may re-calibrate some or all of the system environment 100.

The tracking module 184 tracks movements of the HMD 110 or of the I/O interface 170 using information from the DCA 140, the PCA 150, the one or more position sensors 115, the IMU 120 or some combination thereof. For example, the tracking module 184 determines a position of a reference point of the HMD 110 in a mapping of a local area based on information from the HMD 110. The tracking module 184 may also determine positions of an object or virtual object. Additionally, in some embodiments, the tracking module 184 may use portions of data indicating a position of the HMD 110 from the IMU 120 as well as representations of the local area from the DCA 140 to predict a future location of the HMD 110. The tracking module 184 provides the estimated or predicted future position of the HMD 110 or the I/O interface 170 to the engine 186.

The engine 186 executes applications and receives position information, acceleration information, velocity information, predicted future positions, or some combination thereof, of the HMD 110 from the tracking module 184. Based on the received information, the engine 186 determines content to provide to the HMD 110 for presentation to the user. For example, if the received information indicates that the user has looked to the left, the engine 186 generates content for the HMD 110 that mirrors the user's movement in a virtual local area or in a local area augmenting the local area with additional content. Additionally, the engine 186 performs an action within an application executing on the console 180 in response to an action request received from the I/O interface 170 and provides feedback to the user that the action was performed. The provided feedback may be visual or audible feedback via the HMD 110 or haptic feedback via the I/O interface 170.

Head Mounted Display

Figure 2:
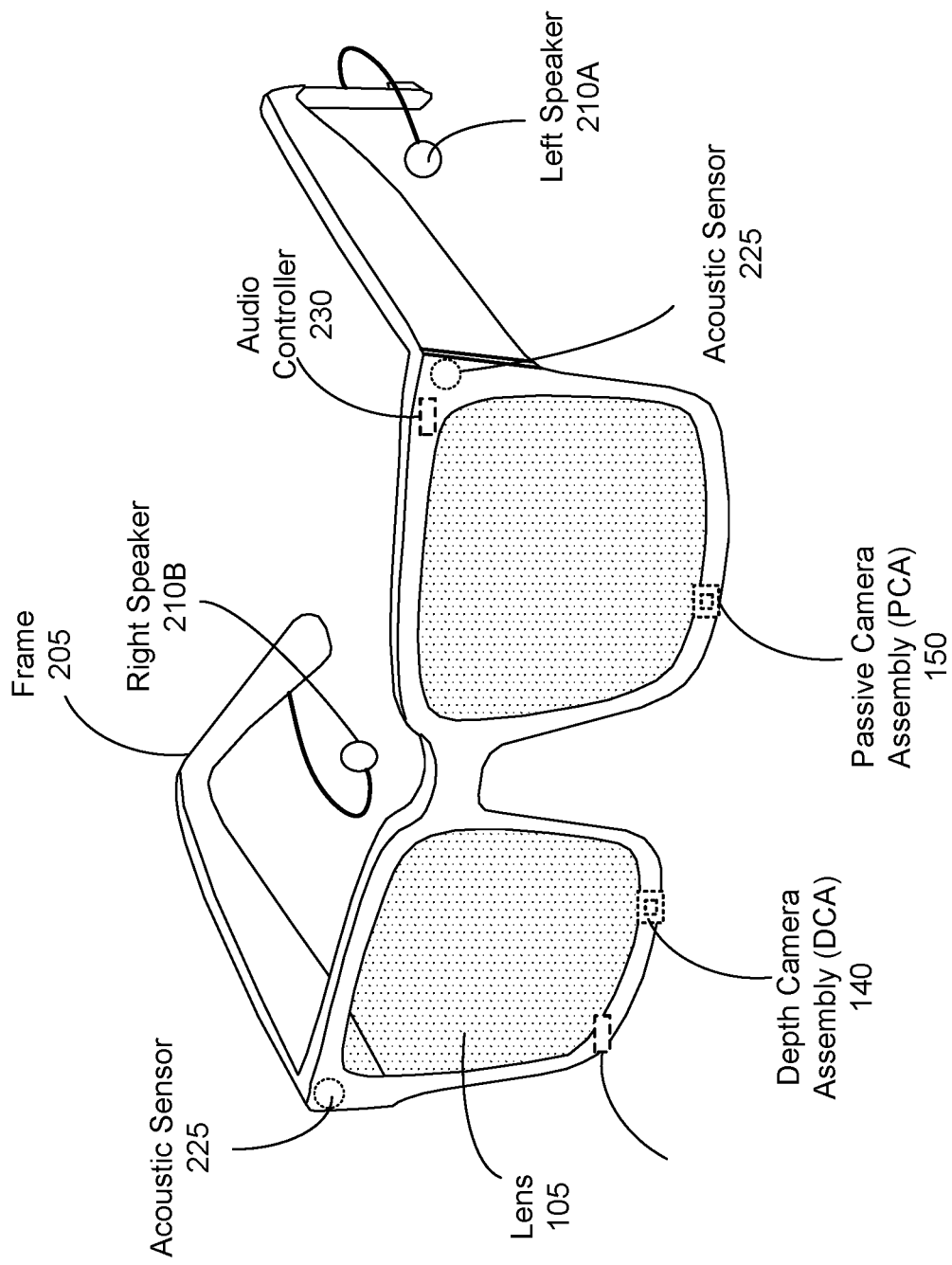
FIG. 2 is a diagram of a HMD, in accordance with one or more embodiments.

FIG. 2 is a perspective view of the head mounted display (HMD) 110, in accordance with one or more embodiments. In some embodiments (as shown in FIG. 1), the HMD 110 is implemented as a NED. In alternate embodiments (not shown in FIG. 1), the headset 100 is implemented as an HMD. In general, the HMD 110 may be worn on the face of a user such that content (e.g., media content) is presented using one or both lenses 105 of the HMD 110. However, the HMD 110 may also be used such that media content is presented to a user in a different manner. Examples of media content presented by the HMD 110 include one or more images, video, audio, or some combination thereof. The HMD 110 may include, among other components, a frame 205, a lens 105, a DCA 140, a PCA 150, a position sensor 115, and an audio system 160. The audio system of the HMD 110 shown in FIG. 2 includes a left binaural microphone 210a, a right binaural microphone 210b, an array of acoustic sensors 225, an audio controller 230, one or more other components, or combination thereof. The audio system of the HMD 110 is an embodiment of the audio system 160 described above in conjunction with FIG. 1. The DCA 140 and the PCA 150 may be part of SLAM sensors mounted the HMD 110 for capturing visual information of a local area surrounding some or all of the HMD 110. While FIG. 2 illustrates the components of the HMD 110 in example locations on the HMD 110, the components may be located elsewhere on the HMD 110, on a peripheral device paired with the HMD 110, or some combination thereof.

The HMD 110 may correct or enhance the vision of a user, protect the eye of a user, or provide images to a user. The HMD 110 may be eyeglasses which correct for defects in a user's eyesight. The HMD 110 may be sunglasses which protect a user's eye from the sun. The HMD 110 may be safety glasses which protect a user's eye from impact. The HMD 110 may be a night vision device or infrared goggles to enhance a user's vision at night. The HMD 110 may be a near-eye display that produces artificial reality content for the user.

The frame 205 holds the other components of the HMD 110. The frame 205 includes a front part that holds the lens 105 and end pieces to attach to a head of the user. The front part of the frame 205 bridges the top of a nose of the user. The end pieces (e.g., temples) are portions of the frame 205 to which the temples of a user are attached. The length of the end piece may be adjustable (e.g., adjustable temple length) to fit different users. The end piece may also include a portion that curls behind the ear of the user (e.g., temple tip, earpiece).

The lens 105 provides or transmits light to a user wearing the HMD 110. The lens 105 may be prescription lens (e.g., single vision, bifocal and trifocal, or progressive) to help correct for defects in a user's eyesight. The prescription lens transmits ambient light to the user wearing the HMD 110. The transmitted ambient light may be altered by the prescription lens to correct for defects in the user's eyesight. The lens 105 may be a polarized lens or a tinted lens to protect the user's eyes from the sun. The lens 105 may be one or more waveguides as part of a waveguide display in which image light is coupled through an end or edge of the waveguide to the eye of the user. The lens 105 may include an electronic display for providing image light and may also include an optics block for magnifying image light from the electronic display, as further described above in conjunction with FIG. 1.

The DCA 140 captures depth image data describing depth information for a local area surrounding the HMD 110, such as a room. In some embodiments, the DCA 140 may include a light projector 142 (e.g., structured light and/or flash illumination for time-of-flight), a plurality of imaging devices (e.g., the active depth sensor 144 and the additional imaging device 146 in FIG. 1) plurality, and a controller 148, as described above in conjunction with FIG. 1. The captured data may be images captured by the imaging device of light projected onto the local area by the light projector. In one embodiment, the DCA 140 may include a controller and two or more imaging devices (e.g., cameras) that are oriented to capture portions of the local area in stereo. The captured data may be images captured by the two or more imaging devices of the local area in stereo. The controller of the DCA 140 computes the depth information of the local area using the captured data and depth determination techniques (e.g., structured light, time-of-flight, stereo imaging, etc.). Based on the depth information, the controller 148 of the DCA 140 determines absolute positional information of the HMD 110 within the local area. The controller 148 of the DCA 140 may also generate a model of the local area. The DCA 140 may be integrated with the HMD 110 or may be positioned within the local area external to the HMD 110. In some embodiments, the controller 148 of the DCA 140 may transmit the depth image data to the mapping server 130 via a network or other communication channel.

The PCA 150 includes one or more passive cameras that generate color (e.g., RGB) image data. Unlike the DCA 140 that uses active light emission and reflection, the PCA 150 captures light from the environment of a local area to generate color image data. Rather than pixel values defining depth or distance from the imaging device, pixel values of the color image data may define visible colors of objects captured in the image data. In some embodiments, the PCA 150 includes a controller that generates the color image data based on light captured by the passive imaging device. The PCA 150 may provide the color image data to the controller 148 of the DCA 140 for further processing or for communication to the mapping server 130.

The array of acoustic sensors 225 monitor and record sound in a local area surrounding some or all of the HMD 110. As illustrated in FIG. 2, the array of acoustic sensors 225 include multiple acoustic sensors with multiple acoustic detection locations that are positioned on the HMD 110. The array of acoustic sensors 225 may provide the recorded sound as an audio stream to the audio controller 230.

The position sensor 115 generates one or more measurement signals in response to motion of the HMD 110. The position sensor 115 may be located on a portion of the frame 205 of the HMD 110. The position sensor 115 may include a position sensor, an inertial measurement unit (IMU), or both. Some embodiments of the HMD 110 may or may not include the position sensor 115 or may include more than one position sensors 115. In embodiments in which the position sensor 115 includes an IMU, the IMU generates IMU data based on measurement signals from the position sensor 115. Examples of position sensor 115 include: one or more accelerometers, one or more gyroscopes, one or more magnetometers, another suitable type of sensor that detects motion, a type of sensor used for error correction of the IMU, or some combination thereof. The position sensor 115 may be located external to the IMU, internal to the IMU, or some combination thereof.

Based on the one or more measurement signals, the position sensor 115 estimates a current position of the HMD 110 relative to an initial position of the HMD 110. The estimated position may include a location of the HMD 110 and/or an orientation of the HMD 110 or the user's head wearing the HMD 110, or some combination thereof. The orientation may correspond to a position of each ear relative to a reference point. In some embodiments, the position sensor 115 uses the depth information and/or the absolute positional information from the DCA 140 to estimate the current position of the HMD 110. The position sensor 115 may include multiple accelerometers to measure translational motion (forward/back, up/down, left/right) and multiple gyroscopes to measure rotational motion (e.g., pitch, yaw, roll). In some embodiments, an IMU, further described above in conjunction with FIG. 1, rapidly samples the measurement signals and calculates the estimated position of the HMD 110 from the sampled data. For example, the IMU integrates the measurement signals received from the accelerometers over time to estimate a velocity vector and integrates the velocity vector over time to determine an estimated position of a reference point on the HMD 110. The reference point is a point that may be used to describe the position of the HMD 110. While the reference point may generally be defined as a point in space, however, in practice the reference point is defined as a point within the HMD 110.

The audio controller 230 provides audio instructions to one or more speakers for generating sound by generating audio content using a set of acoustic parameters (e.g., a room impulse response). The audio controller 230 presents the audio content to appear originating from an object (e.g., virtual object or real object) within the local area, e.g., by transforming a source audio signal using the set of acoustic parameters for a current configuration of the local area. The audio controller 230 receives information describing a sound pressure in an ear canals of the user when speakers of the HMD 110 are presenting audio data to the user from binaural microphone 210A and binaural microphone 210B. Based on the information from the binaural microphones 210A, 210B the audio controller 2230 calibrates one or more speakers, which receive audio instructions from the audio controller 230 to generate sounds. For example, a left speaker obtains a left audio channel from the audio controller 230, and a right speaker obtains and a right audio channel from the audio controller 230. In various embodiments, each speaker is coupled to an end piece of the frame 205, although in other embodiments the speakers, or a speaker array, are integrated into the frame 205 (e.g., in temples of the frame 205) to improve directionality of presented audio content.

The audio controller 230 may obtain visual information describing at least a portion of the local area, e.g., from the DCA 140 and/or the PCA 150. The visual information obtained at the audio controller 230 may include depth image data captured by the DCA 140. The visual information obtained at the audio controller 230 may further include color image data captured by the PCA 150. The audio controller 230 may combine the depth image data with the color image data into the visual information that is communicated (e.g., via a communication module coupled to the audio controller 230, not shown in FIG. 2) to the mapping server 130 for determination of a set of acoustic parameters. In one embodiment, the communication module (e.g., a transceiver) may be integrated into the audio controller 230. In another embodiment, the communication module may be external to the audio controller 230 and integrated into the frame 205 as a separate module coupled to the audio controller 230. In some embodiments, the audio controller 230 generates an audio stream based on sound in the local area monitored by, e.g., the array of acoustic sensors 225. The communication module coupled to the audio controller 420 may selectively communicate the audio stream to the mapping server 130 for updating the visual model of physical spaces at the mapping server 130.

Depth Camera Assembly

Figure 3:
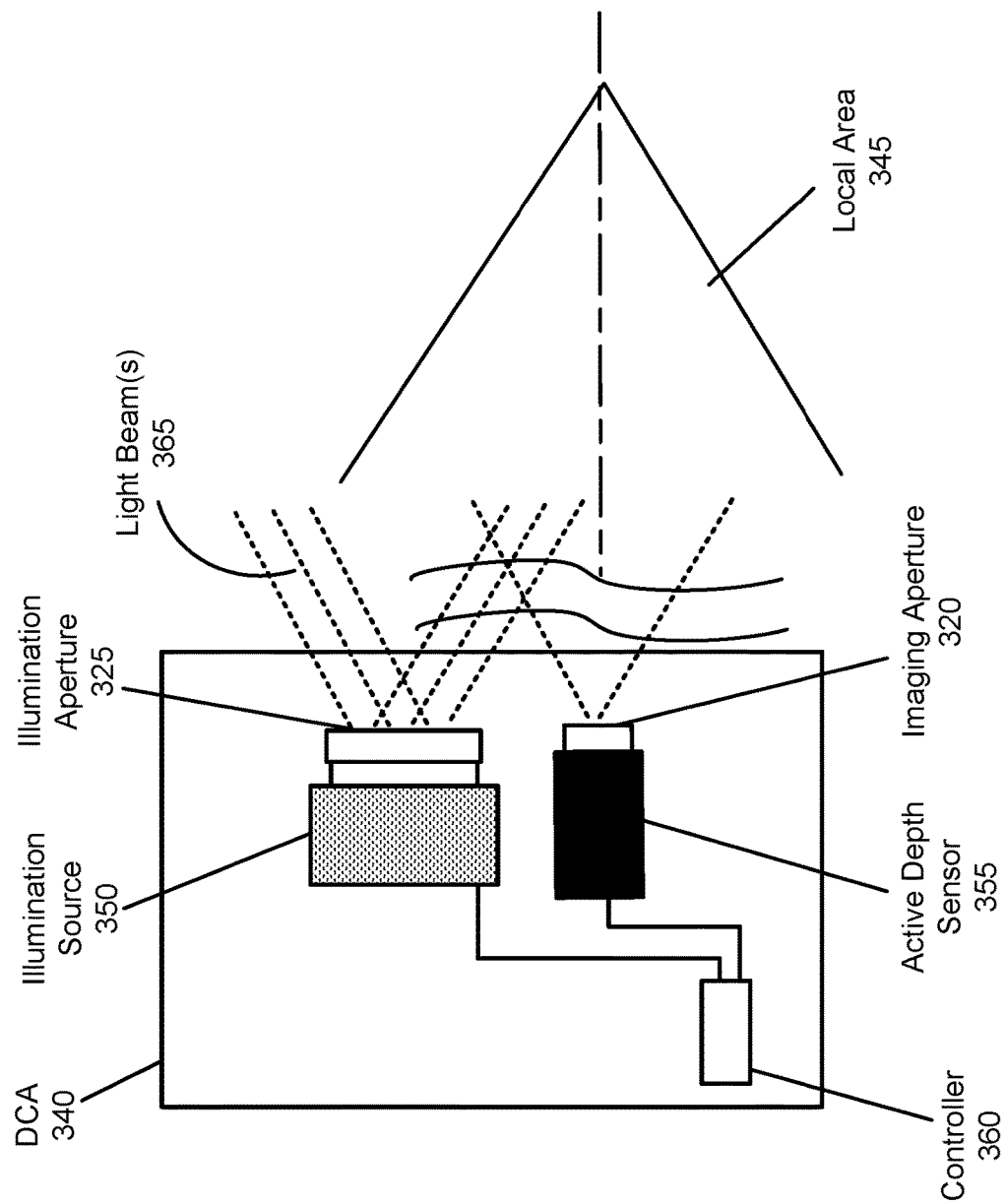
FIG. 3 is a cross section of a front rigid body of the HMD in FIG. 2, in accordance with one or more embodiments.

FIG. 3 is block diagram of one embodiment of a depth camera assembly (DCA) 340, such as the DCA 140 shown in FIG. 1. In other embodiments, the DCA 340 includes different or additional components than those shown in FIG. 3. Further, in some embodiments, the DCA 340 combines functionalities of one or more components shown in FIG. 3 into fewer components.

The DCA 340 for determines depth information of one or more objects in a local area 345 surrounding some or all of the HMD 110. The DCA 340 includes an illumination source 350, an active depth sensor 355, and a controller 360 that may be coupled to both the illumination source 350 and to the active depth sensor 355. The illumination source 350 emits one or more light beams 365 through the illumination aperture 325. The illumination source 350 illuminates the local area 345 with the one or more light beams 365 in accordance with emission instructions generated by the controller 360. The illumination source 350 can be part of an illumination source of a beam steering assembly incorporated into the DCA 340, as further described in conjunction with FIG. 4.

The illumination source 350 may include a plurality of emitters that each emits light having certain characteristics (e.g., wavelength, polarization, coherence, pulse width, temporal behavior, etc.). Various emitters may have common characteristics or different characteristics, and the emitters can be operated simultaneously or individually. Example emitters include laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source 350 can emit the one or more light beams 365 that form a structured light pattern, e.g., a dot pattern. In some embodiments, the illumination source 350 includes a laser diode (e.g., infrared laser diode) and a polarizing element for generating the one or more light beams 365 as polarized light.

The active depth sensor 355 is configured to capture portions of the one or more light beams 365 reflected from the local area 345 through the imaging aperture 320. The active depth sensor 355 includes a detector (not shown in FIG. 3) implemented as a dense array of single photon avalanche diode (SPAD) pixels, as further described below in conjunction with FIGS. 5-11. The active depth sensor 355 may also include a polarization sensitive photodetector that uses, e.g., optically anisotropic materials to detect photons of a specific polarization, e.g., linear, circular, elliptical, etc. The active depth sensor 355 captures one or more images of one or more objects in the local area 345 illuminated with the one or more light beams 365. In various embodiments, the active depth sensor 355 has a focus that spreads captured light across a subset of the multiple SPAD pixels; hence, a point spread function of the active depth sensor 355 spreads light captured by the active depth sensor 355 across multiple SPAD pixels, creating a region of interest comprising the SPAD pixels onto which the active depth sensor 355 directs captured light; hence, the region of interest comprises a subset of the SPAD pixels included in the detector. In the preceding example, a size of the region of interest of SPAD pixels is determined based on an expected maximum or minimum range of the DCA 340 so the region of interest of SPAD pixels is sufficient for analog signal processing or digital histogram processing. As further described below in conjunction with FIG. 5, the detector of the active depth sensor 355 includes one or more macropixels in various embodiments. A macropixel is a group of pixels comprising a number of rows of pixels and a number of columns of pixels. The macropixels are coupled to a common output bus, with different macropixels accessed via a row access control signal, a column access control signal, and an address of a pixel within the macropixel (e.g., an identifier of a row and a column within the macropixel), which increases a speed at which detected photons may be retrieved from the detector. An example architecture of the detector including one or more macropixels is further described below in conjunction with FIGS. 5-11.

The controller 360 may control operation of certain components of the illumination source 350, based on the emission instructions. In some embodiments, the controller 360 may provide the emission instructions to a fine steering element (not shown in FIG. 3) and/or a coarse steering element (not shown in FIG. 3), within the illumination source 350 to control a field-of-view of the local area 345 illuminated by the one or more light beams 365. Additionally, the controller 360 is coupled to the active depth sensor 355 and provides control signals to a detector of the active depth sensor 355 to retrieve information describing photons detected by different pixels of the detector. As further described below in conjunction with FIGS. 5-7, control signals provided to the detector include a row access control signal or a column access control signal identifying a macropixel of the detector from which information describing numbers of photos detected by pixels is retrieved. From a time when the illumination source 350 emitted light into the local area 345 and one or more digital timestamps from the active depth sensor 355 identifying times when the active depth sensor 355 detected light emitted by the illumination source 350 and reflected from one or more objects in the local area 345, depth information to objects in the local area 345 reflecting light from the illumination source 350 may be determined.

The controller 360 is configured to determine depth information for the one or more objects in the local area 345 based at least in part on the captured portions of the one or more reflected light beams. In some embodiments, for depth sensing based on time-of-flight, the controller 360 determines the depth information based on charge stored in one or more accumulators associated with one or more SPAD pixels in the detector of the active depth sensor 355 over a defined amount of time. In some embodiments, the controller 360 provides the determined depth information to a console (not shown in FIG. 3) and/or an appropriate module of the HMD 110 (e.g., a varifocal module, not shown in FIG. 3). The console and/or the HMD 110 may use the depth information to generate content for presentation on the electronic display of the HMD 110 in various embodiments.

In various embodiments, the controller 360 generates an occlusion map of the local area 345 surrounding the HMD 110 from the depth information determined for the one or more objects in the local area 345. The occlusion map identifies locations within the local area 345 where virtual content displayed by an electronic display included in the HMD 110 is not to be displayed. For example, the occlusion mask is a 2-dimensional mask identifying areas of the electronic display of the HMD 110 where virtual content is shown, while in other embodiments the occlusion mask is a 2-dimensional mask identifying areas of the electronic display of the HMD 110 where virtual content is not shown. The occlusion mask depends on a view of the local area surrounding the HMD 110, so different occlusion masks for the local area are maintained by the controller 360 corresponding to different locations within the local area. In various implementations, the occlusion mask identifies areas of the electronic display where a determined depth of an object in the local area corresponding to an area of the electronic display is nearer to the HMD 110 than a depth for virtual content to be displayed in the area of the electronic display. In the preceding example, the object in the local area would occlude the virtual content, so the controller prevents display of the virtual content in the area of the electronic display.

In various embodiments, the controller 360 determines when the illumination source 350 and the active depth sensor 355 are activated. For example, the controller 360 activates the illumination source 350 and the active depth sensor 355 (or an addressable detector included in the active depth sensor 355) in response to determining the HMD 110 is in a local area 345 for which information, such as a model of the local area, about the local area 345 is not stored (i.e., when the HMD 110 is in a local area 345 where the HMD 110 has not previously been). As another example, the controller 360 activates the illumination source 350 and the active depth sensor 355 in response to determining an object moves into a field of view of the HMD 110 while a virtual object is being rendered for display by the electronic display of the HMD 110. Depth information from the active depth sensor 355 is processed by the controller 360 to generate high fidelity spare depth information about objects in the local area 345 that is included in a model stored by the controller 360 or by the console 180. Storage of the model of the local area 345 reduces subsequent reliance on determining depth information by the controller 360 when the HMD 110 is again in the local area 345. When a suitably completed model of the local area 345 is constructed (or available from prior models), the model can be retrieved and used instead of determining depth information using the illumination source 350 and the active depth sensor 355 while the local area 345 surrounding the HMD 110 remains static.

In some embodiments, the controller 360 activates the illumination source 350 and the active depth sensor 355 when an object moves through the field of view of the HMD 110, allowing the controller 360 to determine absolute scale for object detection masks for the object moving through the field of view of the HMD 110. In some embodiments, the controller 360 causes the active depth sensor 355 to capture a higher resolution 2 dimensional image via the active depth sensor 355 (or has an additional 2 dimensional camera included in the DCA 340 capture a higher resolution image of the local area 345 than the active depth sensor 355) for use as a dynamic occlusion mask based on the object moving through the field of view of the HMD 110. In some embodiments, the controller 360 uses a scene detection loop to evaluate whether a current view of the local area 345 surrounding the HMD 110 has at least a threshold amount of differences from a stored model of the local area 345 surrounding the HMD 110. In response to determining the local area 345 has at least the threshold amount of differences from the stored model of the local area 345, the controller communicates with the console 180 to generate an activation map. The controller 360 uses the activation map to control illumination source 350 and the active depth sensor 355.

In some embodiments, the DCA 340 includes an additional 2 dimensional camera capturing images of the local area 345 surrounding the HMD 110 that are used to detect changes in the local area 345 surrounding the DCA 110. The controller 360 is coupled to the additional 2 dimensional camera and provides one or more control signals to the additional 2 dimensional camera. For example, the additional 2-dimensional camera is a grayscale or a red-green-blue (RGB) camera that captures images of the local area 345 surrounding the HMD 110. In some embodiments, the additional 2-dimensional camera may capture images of the local area at different frame rates. For example, the additional 2-dimensional camera captures images of the local area at a relatively low frame rate (e.g., 10 frames per second), and captures images at a higher frame rate for generating an occlusion mask of the local area 345 surrounding the HMD 110. One or more control signals from the controller 360 adjust a frame rate at which the additional 2 dimensional camera capture images of the local area 345. Alternatively, control signals from the controller 360 adjust a frame rate at which the active depth sensor 355 captures images of the local area 345, so the active depth sensor 355 captures both light reflected from the illumination source 350 and images of the local area 345.

Figure 4:
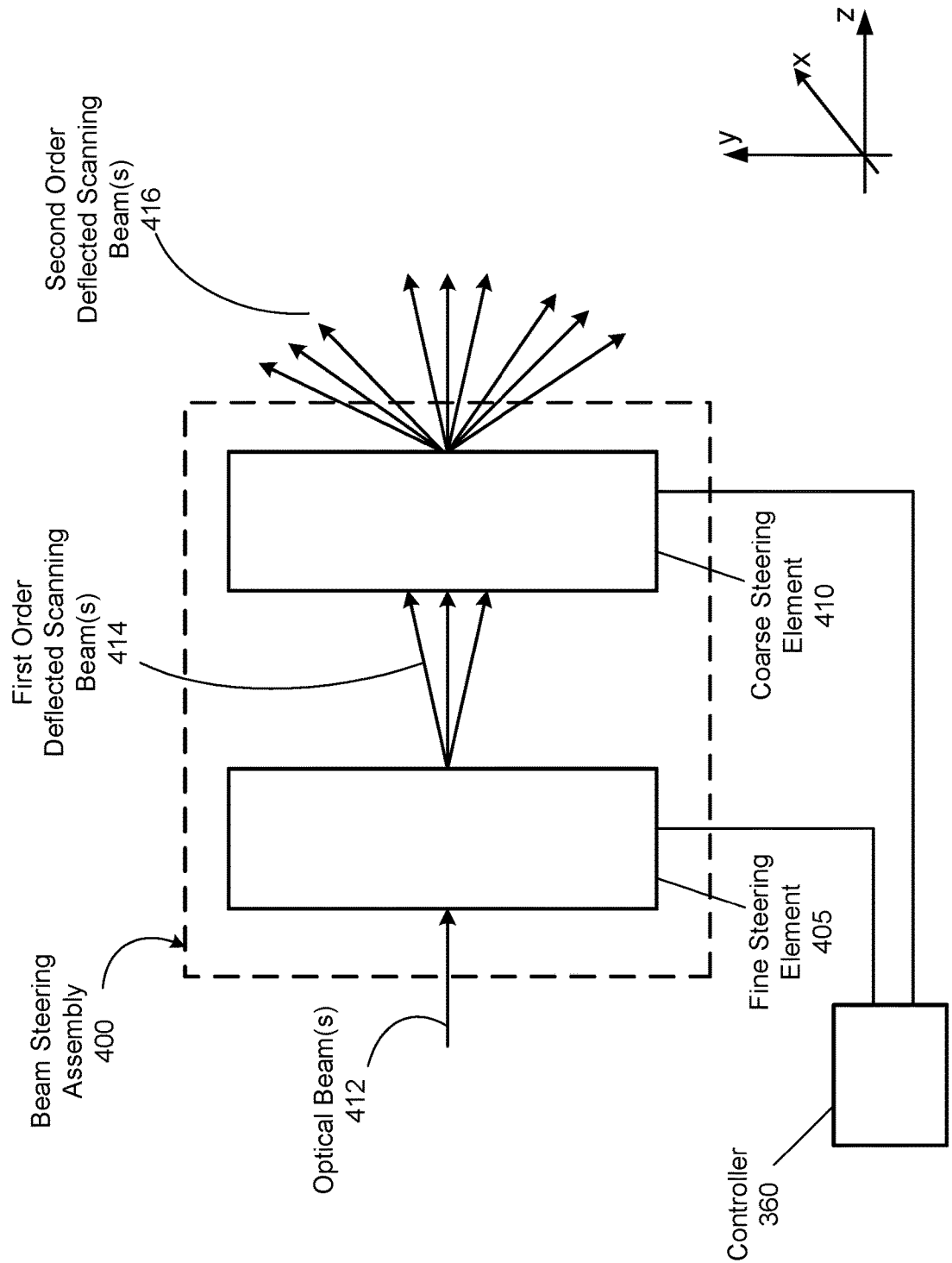
FIG. 4 is a beam steering assembly including a fine steering element and a coarse steering element, which may be integrated into a depth camera assembly (DCA), in accordance with one or more embodiments.

FIG. 4 illustrates an example beam steering assembly 400, which may be part of the DCA 340 in FIG. 3, in accordance with an embodiment. The beam steering assembly 400 cascades a fine steering element 405 with a coarse steering element 410. The fine steering element 405 deflects one or more optical beams 412 emitted from an illumination source (not shown in FIG. 4) to generate one or more first order deflected scanning beams 414. The fine steering element 405 may be configured to rapidly change a scanning angle of the one or more first order deflected scanning beams 414 over a limited range (e.g., between −10 degrees and +10 degrees), based in part on emission instructions from a controller 360. The fine steering element 405 is thus configured to operate at a high rate and can dwell or step adaptively, e.g., based in part on the emission instructions from the controller 360. It should be understood that deflection in relation to the fine steering element 405 is a general term that can also refer to other physical effects, such as refraction, reflection or diffraction, depending on an exact physical element used as the fine steering element 405.

In some embodiments, the fine steering element 405 can be implemented based upon one or more acousto-optic devices. In one embodiment, the fine steering element 405 is implemented as an acousto-optic deflector operating in the Bragg regime. In another embodiment, the fine steering element 405 is implemented as a surface acoustic wave (SAW) deflector. In yet another embodiment, the fine steering element 405 is implemented as a thin grating operating in the Raman-Nath regime. As another example, the fine steering element 405 is implemented using one dimensional or two dimensional optical phased array emitters, in which phase delays may be individually introduced for different emitters, allowing control of beam deflection. In general, the fine steering element 405 is configured to function as a dynamic diffraction grating that diffracts the one or more optical beams 412 to form the one or more first order deflected scanning beams 414 based in part on the emission instructions from the controller 360.

The coarse steering element 410 deflects the one or more first order deflected scanning beams 414 to generate one or more second order deflected scanning beams 416 to allow scanning over a large angular range, e.g., between −60 degrees and +60 degrees along both x and y dimensions (horizontal and vertical dimensions). It should be understood that deflection in relation to the coarse steering element 410 is a general term that can also refer to other physical effects, such as refraction, reflection or diffraction, depending on an exact physical element used as the coarse steering element 410. The one or more second order deflected scanning beams 416 represent an embodiment of the one or more light beams 465 emitted by the DCA 340 in FIG. 3. In some embodiments, the one or more second order deflected scanning beams 416 represent structured light having a dot pattern, a line pattern, or any other suitable pattern. By combining the fine steering element 405 providing a small angular spread with the coarse steering element 410 providing a larger angle deviation, the beam steering assembly 400 is flexible in that the one or more generated second order deflected scanning beams 416 can be projected in different areas of a volume. It should be understood that implementation requirements on the combination of fine steering element 405 and coarse steering element 410 may depend on specifications of performance and constraints related to the beam steering assembly 400. One particular implementation method can be chosen over another for different reasons, including ability to reach a particular angular range amplification from the fine steering element 405 to the coarse steering element 410 (e.g., amplification of six times), a switching speed, a power consumption, a size/weight of components of the beam steering assembly 400, etc.

In some embodiments, the coarse steering element 410 covers a wide range of rates. For example, a scanning speed of the coarse steering element 410 varies from matching that of the fine steering element 405 implemented based upon one or more acousto-optic devices (e.g., MHz scanning speed) to sub-kHz scanning speed. In one embodiment, the coarse steering element 410 is implemented based on scanning lenses. In another embodiment, the coarse steering element 410 is implemented as a liquid lens deflector. In yet another embodiment, the coarse steering element 410 is implemented based on polarization grating stacks. Examples of the beam steering assembly are further described in U.S. patent application Ser. No. 15/696,907, filed on Sep. 6, 2017, which is hereby incorporated by reference in its entirety.

Illumination Source

Figure 5:
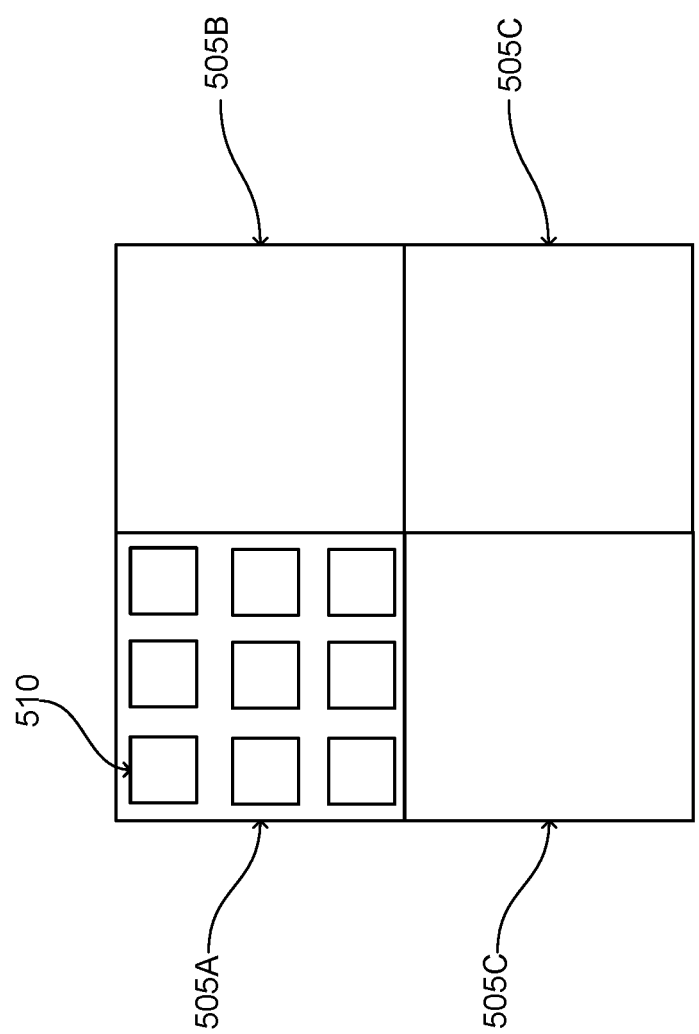
FIG. 5 is an example illumination source included in a DCA, in accordance with one or more embodiments.
Figure 6:
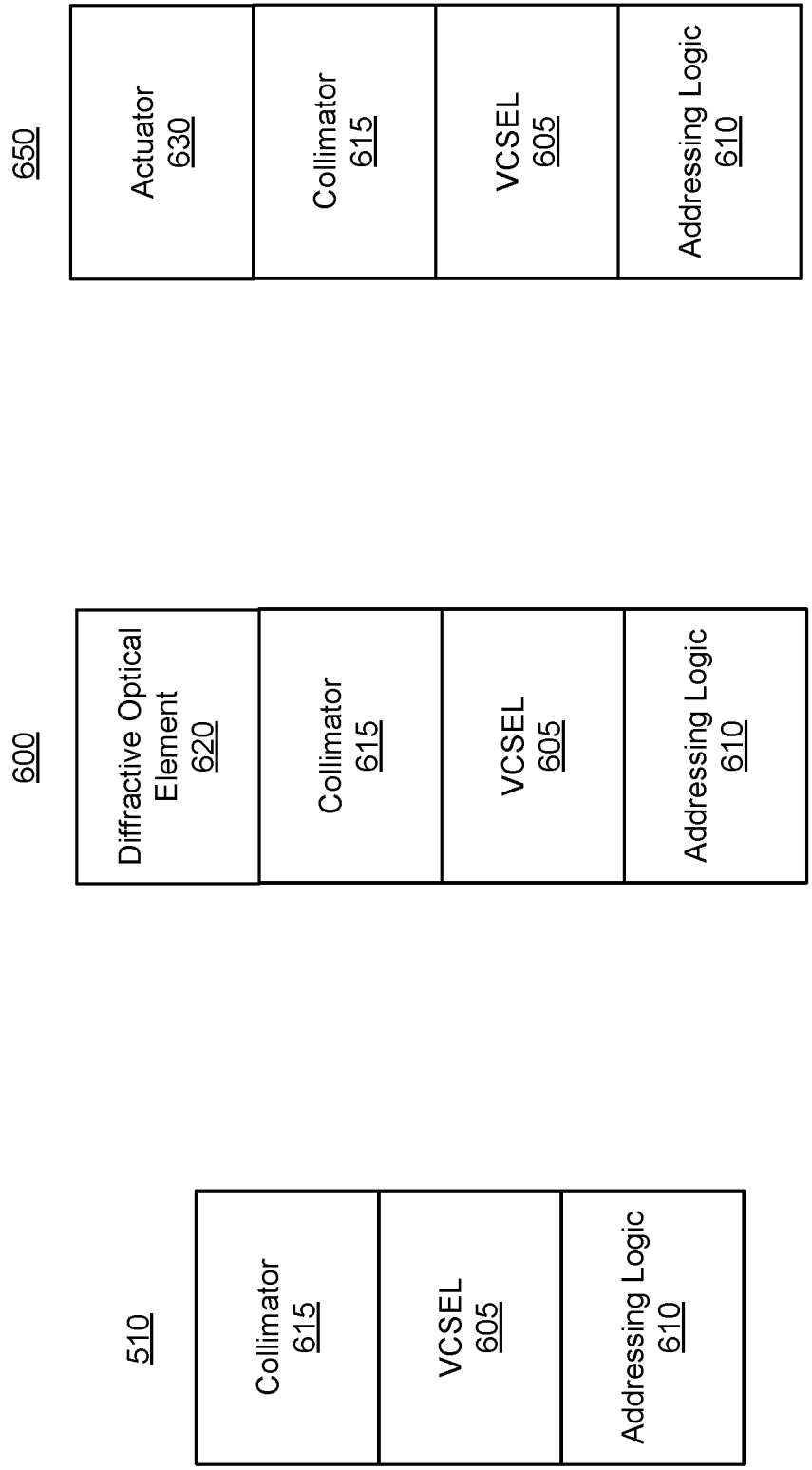
FIGS. 6A-6C are example emitters included in an illumination source of a DCA, in accordance with one or more embodiments.

FIG. 5 shows one embodiment of an illumination source 350 of a depth camera assembly 340. In the example shown by FIG. 5, the illumination source 350 includes multiple illumination blocks 505A, 505B, 505C, 505C (referred to individually using reference number 505). For purposes of illustration, FIG. 5 shows an example where the illumination source 350 includes four illumination blocks 505A, 505B, 505C, 505D, but in other embodiments the illumination source 350 includes any suitable number of illumination blocks 505.

Each illumination block 505 includes one or more emitters 510, with an emitter configured to emit light. For example, each emitter 510 is a vertical-cavity surface-emitting lasers (VCSEL); however, in other embodiments, each emitter 510 is any suitable device capable of emitting light. In some embodiments, each illumination block 505 includes nine emitters 510 (e.g., VCSELs) arranged in a three by three grid; however, in other embodiments, illumination blocks 505 may include any suitable number of emitters 510 having any suitable arrangement relative to each other. In various embodiments, each illumination block 505 includes a common number of emitters 510 (e.g., each illumination block 505 includes nine emitters 510). Through addressing logic, each emitter 510 may be individually activated to emit light; alternatively, a group of emitters 510 are activated via the addressing logic. The illumination source 350 is configured so each emitter 510 emits a single dot of light into a local area surrounding the DCA 340 in some embodiments. Alternatively, each emitter 510 includes a diffractive optical element (DOE) so an emitter 510 emits multiple points into the area surrounding the DCA 340. For example, an emitter 510 includes a VCSEL and a 2×2 tiler DOE configured so the emitter 510 emits four dots of light into the local area surrounding the DCA 340 when activated. However, in other embodiments, an emitter 510 may be configured to emit any suitable number of dots into the area surrounding the DCA 340 when activated.

In various embodiments, the illumination source 350 also includes a lens or other optical element positioned so light from the emitters 510 passes through the lens or other optical element before reaching the local area surrounding the DCA 340. The lens or other optical element defocuses light from the emitters 510. By defocusing light from emitters, the illumination source causes light from the emitters to be incident on a larger number of pixels of a detector included in the active depth sensor 355 of the DCA 340. This increases a probability of the detector detecting light from the illumination source 350 that was reflected by one or more objects in the area surrounding the DCA 340.

FIG. 6A is an example emitter 510 included in the illumination source 350 of the DCA 340. In the example of FIG. 6A, the emitter 510 includes a vertical-cavity surface-emitting lases (VCSEL) 605 coupled to addressing logic 610. The VCSEL is configured to emit light in response to receiving an activation signal from the addressing logic 610. The addressing logic 610 receives a control signal and generates the activation signal in response to receiving the control signal. Hence, the addressing logic 610 specifies when the VCSEL 605 emits light. Additionally, the emitter 510 includes a collimator 615 configured so light emitted by the VCSEL 605 passes through the collimator 615 before being emitted into the local area surrounding the DCA 340. The collimator 615 collimates the light emitted by the VCSEL 605 so collimated light is emitted from the VCSEL 605 into the local area surrounding the DCA 340.

FIG. 6B is an example of an alternative emitter 600 included in included in the illumination source 350 of the DCA 340. In the example of FIG. 6B, the emitter 510 includes the VCSEL 605, the addressing logic 610, and the collimator 615 described above in conjunction with FIG. 6A. Additionally, the emitter 600 includes a diffractive optical element 620 positioned so light from the collimator 610 passes through the diffractive optical element 620 before reaching the local area surrounding the DCA 340. The diffractive optical element 620 increases a number of points of light emitted by the emitter 600 into the local area. For example, the diffractive optical element 620 is a 2×2 tiler that generates four dots of light from light exiting the collimator 615, increasing a number of dots of light emitted into the local area surrounding the DCA 340 by the emitter 600. While this decreases an amount of power per dot of light emitted into the local area, this increases a spatial density of the DCA 340, allowing higher spatial density determination of depths of objects in the local area surrounding the DCA 340.

FIG. 6C is an example of an alternative emitter 650 included in included in the illumination source 350 of the DCA 340. In the example of FIG. 6C, the emitter 510 includes the VCSEL 605, the addressing logic 610, and the collimator 615 described above in conjunction with FIG. 6A. Additionally, the emitter 650 shown in FIG. 6C includes an actuator 630 positioned so light from the collimator 610 passes through the actuator 630 before reaching the local area surrounding the local area surrounding the DCA 340. The actuator 630 is a tunable optical component having a different diffractive index than the collimator 615, so the actuator 630 repositions light output from the collimator 615 repositions the light output by the collimator 615 when the light is emitted into the local area surrounding the DCA 340. In some embodiments, the actuator 630 is a micro-electrical-mechanical system (MEMS) actuator that is repositioned relative to the collimator 615 based on a received control signal to reposition light from the collimator 615 in the local area surrounding the DCA 340. Alternatively, the actuator 630 may be a liquid crystal or other component capable of repositioning light output from the collimator 615. In other embodiments, the actuator 630 changes times when light from the collimator 615 is emitted into the local area surrounding the DCA 340. For example, the actuator 630 allows light from the collimator 615 to enter the local area surrounding the DCA 340 when the actuator 630 receives a control signal but blocks light from the collimator 615 from entering the local area surrounding the DCA 340 when the actuator 630 receives an alternative control signal or does not receive a control signal. Inclusion of the actuator 630 in the emitter 650 allows the DCA to obtain higher spatial density while limiting emitter size.

Imaging Device Detector

Figure 7:
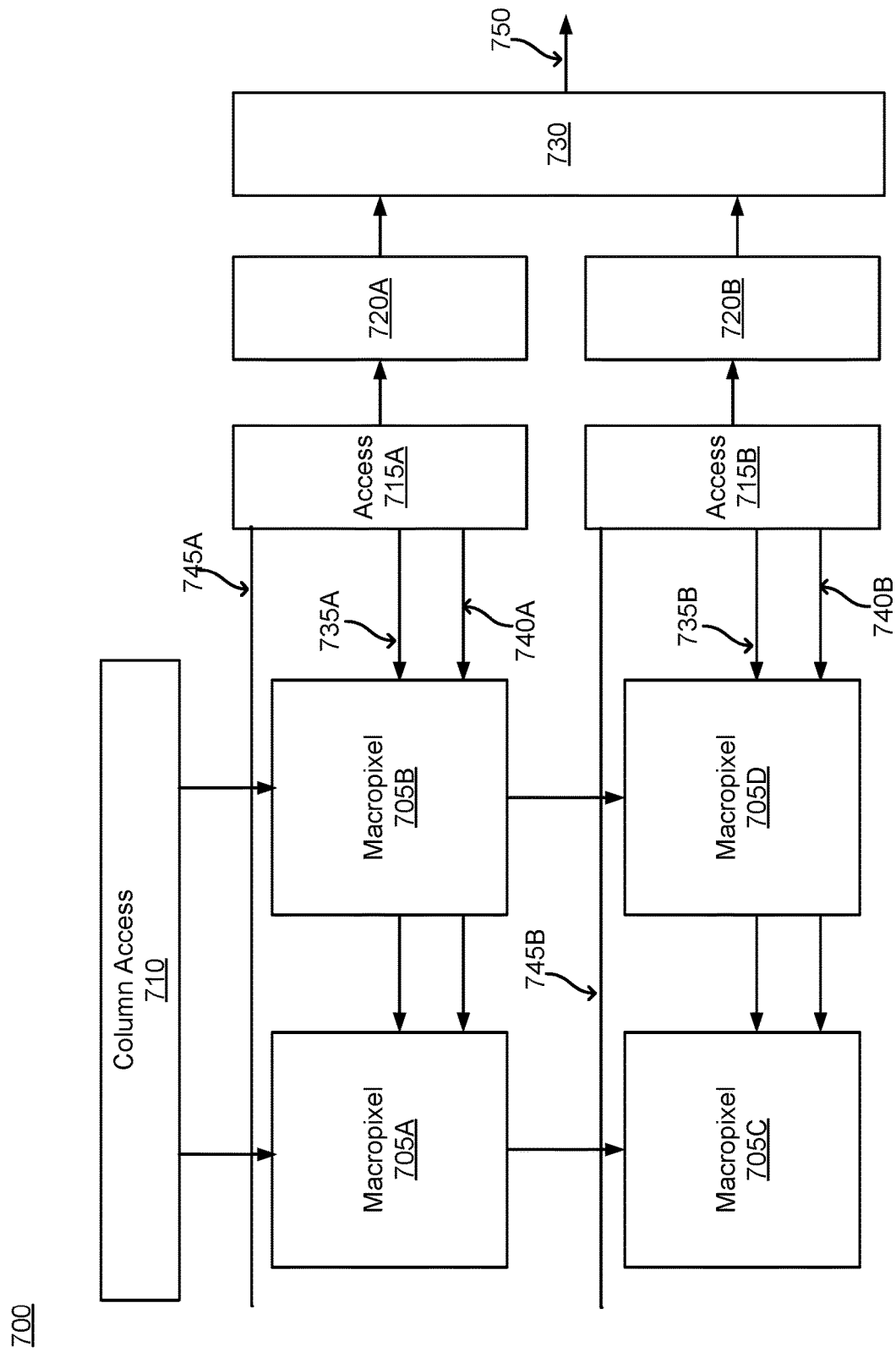
FIG. 7 is an example of a detector of an imaging device of a DCA including macropixels, in accordance with one or more embodiments.

FIG. 7 illustrates one embodiment of a detector 500 of the active depth sensor 355 of the DCA 340. In the example shown by FIG. 7, the detector 700 comprises a two-dimensional array of macropixels 705A-705D (also referred to individually and collectively using reference number 705). Each macropixel 705 includes a group of pixels, such as SPAD pixels. Further, each macropixel 705 includes a number of rows of pixels and a number of columns of pixels. In various embodiments, a macropixel 705 includes a number of rows of pixels that equals a number of columns of pixels; for example, a macropixel 705 includes 16 rows of pixels and 16 columns of pixels, so the macropixel 705 includes 256 pixels. However, in other embodiments, a macropixel 705 includes a number of rows of pixels that differs from a number of columns of pixels. The macropixels 705 are arranged in rows and columns to simplify access to different macropixels 705. In the example of FIG. 7, macropixel 705A and macropixel 705B are in a row, while macropixel 705C and macropixel 705D are in another row. Similarly, macropixel 705A and macropixel 705C are in a column, while macropixel 705B and macropixel 705D are in another column.

Further, the detector 700 includes a column access module 710, access modules 715A, 715B (also referred to individually and collectively using reference number 715), compression modules 720A, 720B (also referred to individually and collectively using reference number 720), and a serialization module 730. The column access module 710 receives a column access control signal identifying a column of macropixels 705 from which data is retrieved. The column access module 710 receives a column access control signal including an identifier of a column including a macropixel 705 from which information identifying numbers of photos detected by pixels within the macropixel 705 is retrieved. The column access module 710 is coupled to each macropixel 705 through control lines corresponding to different columns of macropixels 705.

The access modules 715A, 715B receive a row access control signal identifying a row of macropixels 705 from which data is retrieved. In the example shown by FIG. 7, each row of macropixels 705 is coupled to a different access module 515. An access module 715A, 715B is coupled to macropixels 705 in a row corresponding to the access module 715A, 715B by a row control bus 735A, 735B. In the example of FIG. 7, access module 715A is coupled to macropixels 705A, 705B by row control bus 735A, while access module 715B is coupled to macropixels 705C, 705D by row control bus 735B. An access module 715 receives a row access control signal including an identifier of a row of macropixels coupled to the access module 715 to from which information identifying numbers of photos detected by pixels within the macropixel 705 is retrieved. Hence, column access control signals obtained by the column access module 710 and row access control signals obtained by one or more access modules 715 identify a column and a row, respectively, including a macropixel 705 from which information identifying numbers of photons detected by pixels within the macropixel 705 is retrieved. An output line 745A, 745B (also referred to individually and collectively using reference number 745) is coupled to each macropixel 705A-D, and information retrieved from a macropixel 705 corresponding to a row access signal and a column access signal is communicated to the access module 715 coupled to a row including the macropixel 705 via the output line 745A, 745B. While FIG. 7 shows an example implementation where a single output line 745A, 745B is coupled to a macropixel 705, in other embodiments, a macropixel 705 may be coupled to multiple parallel output lines.

Each access module 715 is also coupled to macropixels 705 in a row corresponding to the access module 715 by a pixel address bus 740A, 740B. An access module 715 identifies a pixel within the macropixel 705 via an address corresponding to the pixel within the macropixel, and transmits a request for data including the address to a macropixel 705, causing data from the pixel corresponding to the address describing photon detections by the pixel to be communicated to the access module 715 via an output line 745 coupled to the macropixel 705. Hence, the access module 715 retrieves data describing photon detections by different pixels within a macropixel 705 based on addresses of pixels within the macropixel 705. In various embodiments, an address of a pixel within a macropixel 705 is a sequence of bits, with different bit sequences corresponding to different pixels within the macropixel 705. For example, a macropixel 705 includes 16 rows of pixels and 16 columns of pixels, and an eight bit sequence is used to identify individual pixels within the macropixel 705. In different embodiments with different numbers of rows of pixels and columns of pixels in a macropixel 705 and parallel output lines, a different length sequence of bits is used to identify different pixels within a macropixel 705. For example, a sequence of bits having a length of a base 2 logarithm of a product of a number of rows in a macropixel 505 and a number of columns in the macropixel 705 is used to identify individual pixels within the macropixel 705. While FIG. 7 shows an example where the detector includes the column access module 710 and multiple access modules 715, in other embodiments, the detector 700 selects a macropixel 705 based on one or more control signals using any suitable method.

Each access module 715A, 715B is coupled to a compression module 720A, 720B. Hence, each row of macropixels 705 is coupled to a compression module 720 via the access module 715 coupled to a row including the macropixels 705. A compression module 720 removes certain data obtained from one or more pixels in a macropixel 705. For example, data extracted from a pixel includes a flag indicating whether the data is recent (occurring within a threshold amount of time from a current time) or old (occurring greater than the threshold amount of time from the current time), and a compression module 720 removes data extracted from pixels in a macropixel 705 having a flag indicating data extracted from pixels in the macropixel 705 is old. This allows a compression module 720 to remove data from pixels in a macropixel 705 that was captured by the pixels greater than a threshold amount of time from a time when the data is obtained from the pixels, reducing an amount of data transmitted from the detector 700 and improving accuracy of depth information determined from the data obtained from the macropixel 705. For example, a compression module 720 removes data from a pixel (e.g., a digital timestamp signal) having a flag indicating the data from the pixel is old. Hence, the compression module 720 outputs the flag indicating the data from the pixel is old, but not the data from the pixel. However, if the flag indicates data from a pixel is recent, the compression module 720 outputs both the flag indicating the data from the pixel is recent and the data from the pixel (e.g., a digital timestamp). This allows the compression module 720 to reduce the amount of data from a macropixel 705 transmitted via the output bus 750 by removing data indicated as old and transmitting the flag identifying the data as old in place of the old data from a pixel.

In various embodiments, each macropixel 705 includes a counter maintaining a count of a number of photon detections by pixels in the macropixel 705 having a flag indicating the photon detections are recent (i.e., indicating the photon detections occurred within a threshold amount of time from a current time). This allows a macropixel 705 to maintain a count of a number of recent photon detections by pixels within the macropixel 705. The controller 360 of the DCA may maintain a threshold number of recent photon detections and compare the count of the number of recent photon detections maintained by the counter of a macropixel 505 to the threshold number. In response to the number of recent photon detections stored in the counter of the macropixel 705 equaling or exceeding the threshold number, the controller 360 transmits a row access control signal and a column access control signal identifying the macropixel 505 to the detector 700 to obtain data describing photon detections by pixels in the macropixel 505. In various embodiments, the threshold number of recent photon detections is specified based on constraints on power consumption or constraints on a rate at which data is obtained from the detector 700. Hence, inclusion of a counter in a macropixel 705 allows the DCA 340 to more selectively obtain data from different macropixels 705 in the detector 700 based on numbers of recent photon detections by different macropixels 705.

The serialization module 730 is coupled to the compression modules 720 and to an output bus 750. The serialization module 730 combines data from multiple pixels into a serial data stream that is output to the controller 360 or to another processor via the output bus 550. For example, the serialization module 730 is a dual clock first-in first-out element that is populated with data obtained from pixels in a macropixel 705; as further described above, the data included in the serialization module 730 from a compression module 720 is limited to data from pixels in the macropixel 705 having a flag indicating data extracted from pixels in the macropixel 705 is recent. In various embodiments, the output bus 750 is a low voltage differential signaling (LVDS) channel allowing high-speed synchronous readout of data from the serialization module 750.

Figure 8:
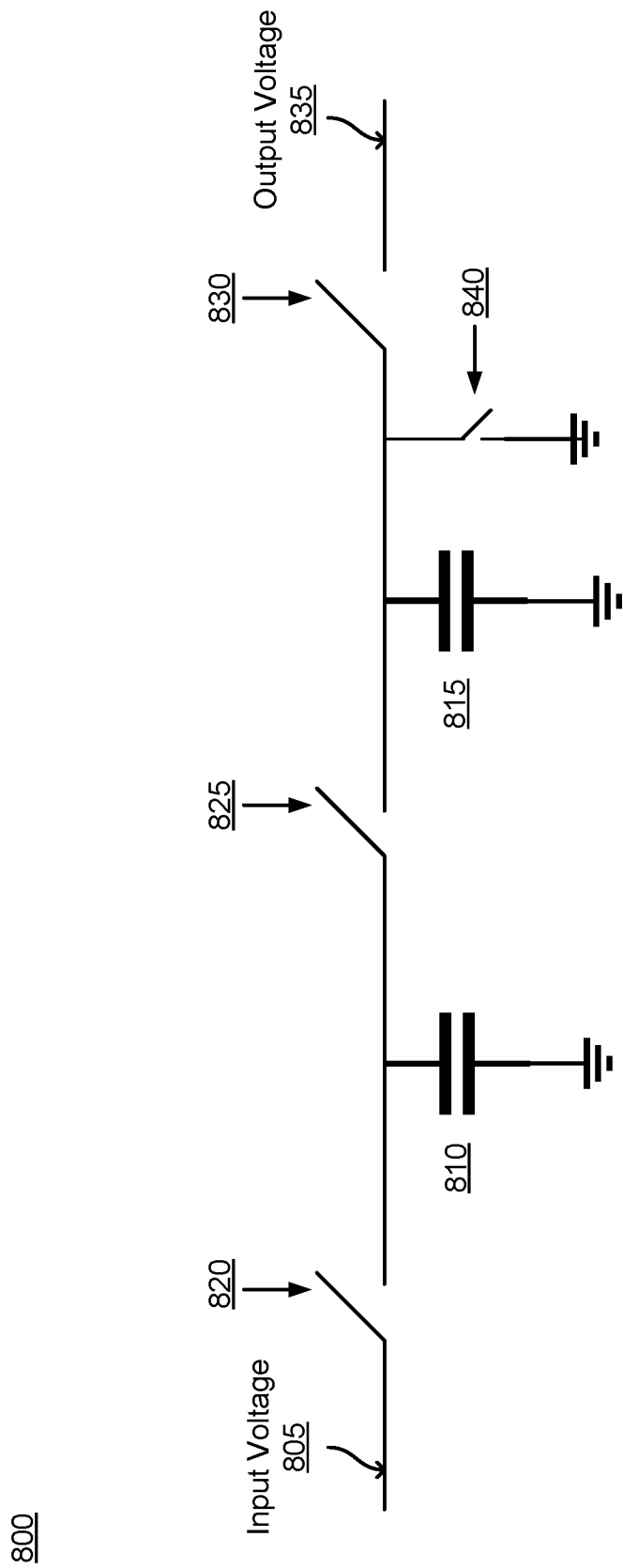
FIG. 8 is an example charge sharing memory element, in accordance with one or more embodiments.

Storing a histogram of photon detection events detected by individual macropixels of the detector 500 allows for more rapid storage of the histogram. In some embodiments, a charge based memory is included in each pixel, allowing for compact storage capable of analog readout. For example, a pixel is coupled to a charge-sharing memory element that uses a fixed charge transfer function to increment in fixed steps. FIG. 8 shows one embodiment of a charge-sharing memory element 800. In the example of FIG. 8, a fixed input voltage 805 is coupled to a holding capacitor 810 via a switch 820. When the switch 820 is activated via a control signal or otherwise, the input voltage 805 charges the holding capacitor 820. Subsequently, the switch 820 is deactivated, decoupling the holding capacitor 820 from the input voltage 805. The holding capacitor 820 is coupled to a sharing capacitor 815 via a charging switch 825. When the charging switch 825 is activated, charge accumulated by the holding capacitor 810 is shared with the sharing capacitor 815. When an output switch 830 coupled to the sharing capacitor 815 is activated via a control signal, an output voltage 835 from the sharing capacitor 815 is obtained. In various embodiments, the output switch 830 couples the sharing capacitor 815 to an output bus from which the output voltage 835 is obtained. In some configurations, the charge-sharing memory element 800 has a quasi-linear transfer function, and non-linearity may be corrected via a lookup table included in an analog to digital converter coupled to an output bus to which the sharing capacitor 815 is coupled via the output switch 830, or other suitable correction method. A reset switch 840 couples the sharing capacitor 815 to ground, and when the reset switch is activated 840 by a reset signal, the sharing capacitor 815 is coupled to ground, draining stored charge from the sharing capacitor 815.

Figure 9:
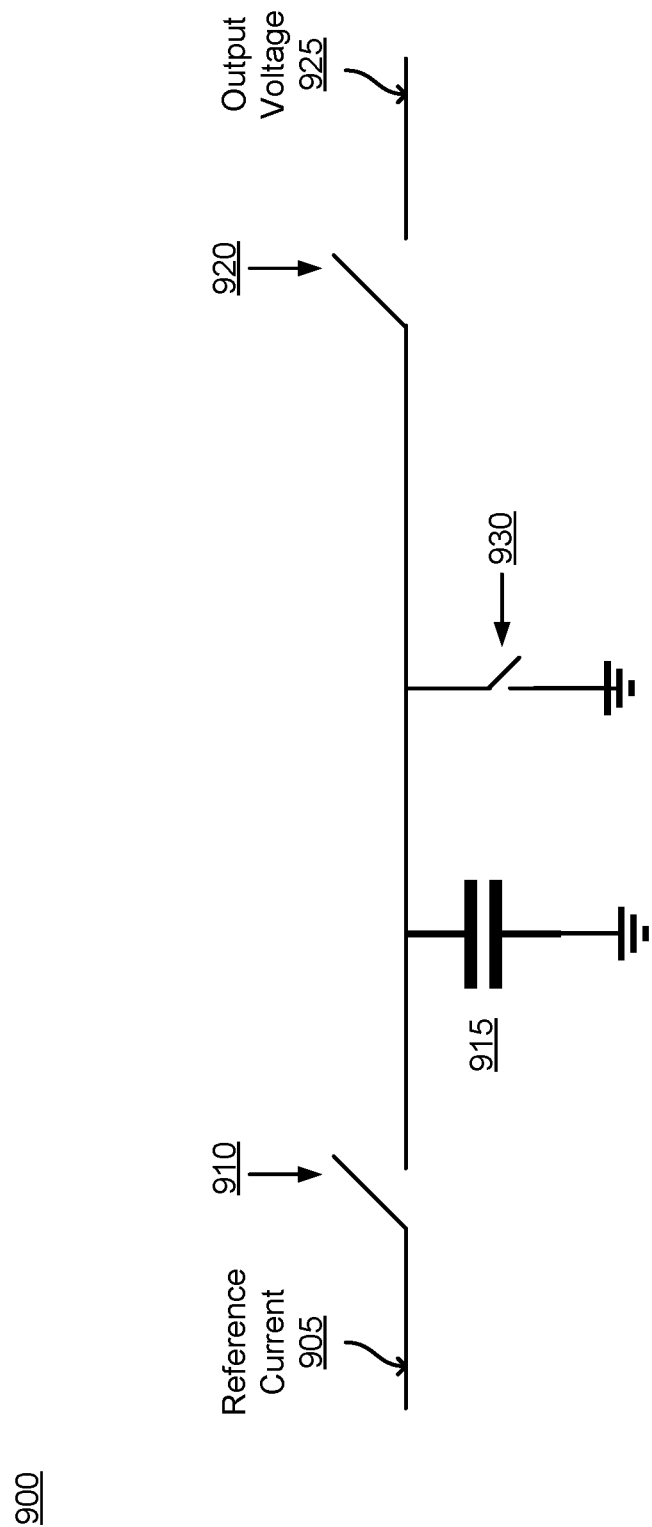
FIG. 9 is an example charge pump memory element, in accordance with one or more embodiments.

Alternatively, a pixel is coupled to a charge pump memory element that uses a fixed current a fixed pulse width to increment fixed steps in charge. FIG. 9 shows one embodiment of a charge pump memory element 900. In the example of FIG. 9, a fixed reference current 905 is coupled to a sharing capacitor 915 via a switch 910. When the switch 910 is activated, the sharing capacitor 915 is charged. In various embodiments, the fixed reference current 905 and a specific pulse width during which the switch 910 is activated defines the charge (or voltage) step of the charge pump memory element 900 by specifying an amount by which the sharing capacitor 915 is charged. In various embodiments, the step in charge is linear. The fixed reference current 905 may be common to multiple charge pump memory elements 900 in various embodiments, so the charge pump memory element 900 acts as a current mirror for the reference current 905. When an output switch 920 coupled to the sharing capacitor 915 is activated via a control signal, an output voltage 925 from the sharing capacitor 915 is obtained. In various embodiments, the output switch 920 couples the sharing capacitor 915 to an output bus from which the output voltage 925 is obtained. In various embodiments, a control signal to select a charge pump memory element 900 for which the corresponding output switch 920 is activated to obtain the output voltage 925 is based on an event signal indicating a photon detection by the pixel coupled to the charge pump memory element 900 and an address of the pixel coupled to the charge pump memory element 900 (e.g., an identifier of a column and a row of the pixel coupled to the charge pump memory element). For example, the event signal and the address information are inputs to a NAND gate, and the output of the NAND gate is the control signal for selecting the specific charge pump memory element 900. A reset switch 930 couples the sharing capacitor 915 to ground, and when the reset switch is activated 930 by a reset signal, the sharing capacitor 915 is coupled to ground, draining stored charge from the sharing capacitor 915. Using charge based memory elements, such as the charge pump memory element 900 or the charge sharing memory element 800 may allow for sequential operation of the detector, where a row of pixels in the detector is exposed to light from the local area and the charge accumulated by different pixels of the row is read while another row is exposed to the light from the local area.

Figure 10:
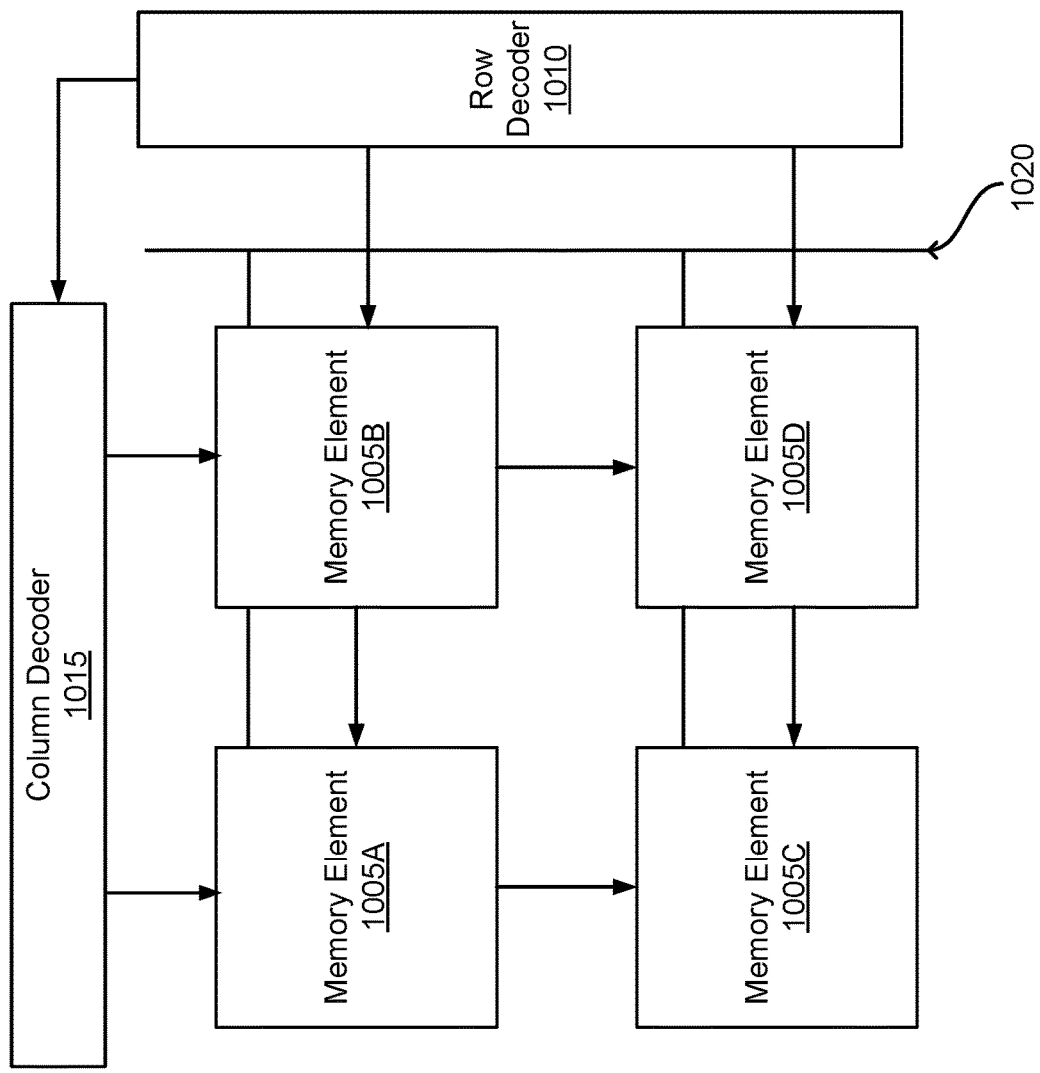
FIG. 10 is an example detector of an imaging device of a DCA using a timing reference to identify photon detections by macropixels of the detector, in accordance with one or more embodiments.

To decrease power consumption, rather than couple a time-to-digital converter (TDC) to pixels in a macropixel, a detector in the active depth sensor 355 uses a timing reference, rather than TDCs coupled to different pixels within a macropixel to determine a histogram of photon detection by pixels. FIG. 10 is an example of a portion of a macropixel 1000 included in an active depth sensor 355 using a timing reference. In the example of FIG. 10, memory elements 1005A, 1005B, 1005C, 1005D (individually and collectively referred to using reference number 1005) including multiple pixels are shown. In various embodiments, the memory elements 1005 are included in pixels of the macropixel, while in other embodiments each memory element 1005 is coupled to a corresponding pixel of the macropixel 1000. The memory elements 1005 may each be a charge based memory element, as further described above.

A row decoder 1010 is coupled to each memory element 1005. In various embodiments, the row decoder 1010 is a voltage controlled oscillator (VCO), such as a multi-phase VCO. For example, the row decoder 1010 is a ring VCO. In the example of FIG. 10, the row decoder 1010 is shared among multiple memory elements 1005, so a VCO is shared between multiple memory elements 1005 in some embodiments. Additionally, when the row decoder 1010 is a VCO, frequency pulling may be used to synchronize the VCO, or to synchronize multiple VCOs used as the row decoder 1010.

The column decoder 1015 is also coupled to each memory element 1005 and comprises a counter in various embodiments. For example, the column decoder 1015 comprises cascaded flip-flops having a common clock signal provided by the row decoder 1010. When the row decoder 1010 is a VCO, in the preceding example, each period of the VCO produces a bit shift in the column decoder 1015. Hence, row decoder 1010 and the column decoder 1015 allow selection of individual memory elements 1015. For example, the row decoder 1010 and the column decoder 1015 select a memory element 1005 at a particular row and a particular column that that is incremented when the macropixel 1000 detects light emitted by the addressable illumination source. If the memory elements 1005 are charge based memory elements, the row decoder 1010 and the column decoder 1015 specify a row and a column of a memory element 1005 where charge is stored when the macropixel 1000 detects light from the addressable illumination source.

An event output 1020 is coupled to each memory element 1005. An output event signal is transmitted from the memory element 1005 via the event output 1020. In various embodiments, an output event signal from a memory element 1005 is a combination of photon detection events captured by a pixel coupled to, or including, the memory element 1005.

Multimode Operation of Depth Camera Assembly

Figure 11:
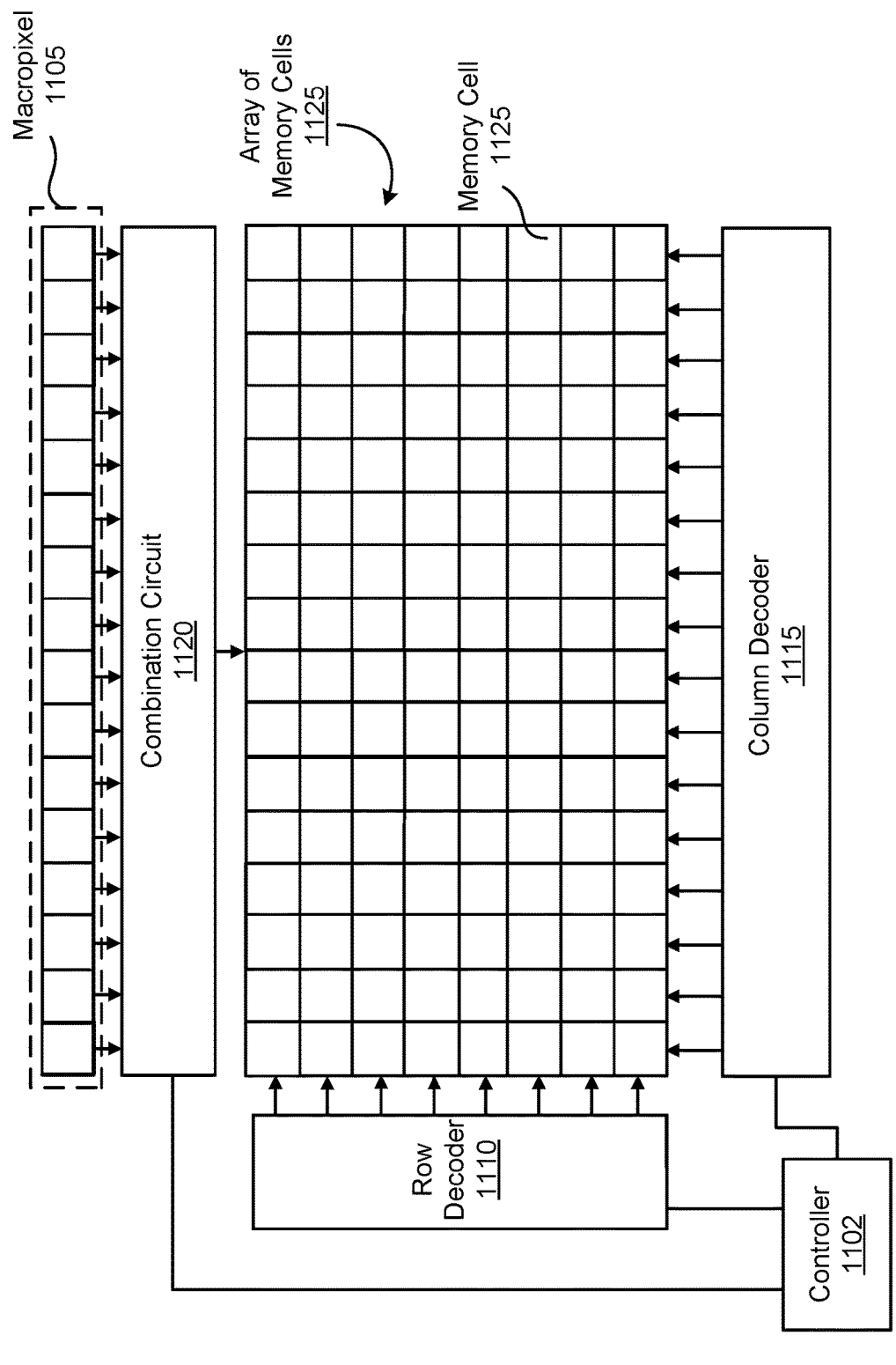
FIG. 11 illustrates an example unit cell of a multimode detector that may be configured for different depth sensing modalities, in accordance with one or more embodiments.

FIG. 11 illustrates an example unit cell 1100 of a multimode detector that may be configured for different depth sensing modalities, in accordance with one or more embodiments. The multimode detector may include an array of unit cells 1100. The multimode detector can be viewed as an extension of the detector 700 where each macropixel 705 is replaced with a unit cell 1100. The unit cell 1100 includes a macropixel 1105 connected to an array of memory cells 1125. The unit cell 1100 may further include a controller 1102, a row decoder 1110, a column decoder 1115, and a combination circuit 1120. The unit cell 1100 may include more or fewer components than what is shown in FIG. 11. The multimode detector comprising the array of unit cells 1100 may detect light reflected from a target area illuminated by light pulses (e.g., emitted from the illumination source 350), while operating in one of multiple depth sensing modes. In some embodiments, the plurality of light pulses illuminating the target area comprise a structured light pattern (e.g., a dot pattern). The multimode detector may be part of a DCA, e.g., the DCA 340. The multimode detector may be an embodiment of the active depth sensor 355.

The macropixel 1105 may capture portions of the light pulses reflected from the target array. The macropixel 1105 may include a group of pixels, such as SPAD pixels. The macropixel 1105 may have a structure substantially the same as the macropixel 705 or the macropixel 1000. The macropixel 1105 may also operate substantially in the same manner as macropixel 705 or the macropixel 1000. The macropixel 1105 may be a one-dimensional array of pixels or a two-dimensional array of pixels. The macropixel 1105 as shown includes 16 pixels, but in other embodiments may include some other number of pixels (e.g., 64 pixels organized as 8×8 array of pixels). In cases when the plurality of light pulses illuminating the target area comprise a dot pattern, the macropixel 1105 may capture portions of reflected light originating from one dot in the dot pattern. Each pixel in the macropixel 1105 may be coupled to the combination circuit 1120 and/or the array of memory cells 1125 for providing captured light signals to other components of the unit cell 1100.

The row decoder 1110 and the column decoder 1115 represent access circuits that may provide access to at least one of the memory cells 1125 for storage of light signals captured at e.g., the macropixel 1105. The row decoder 1110 may operate substantially in the same manner as the row decoder 1010, and the column decoder 1115 may operate substantially in the same manner as the column decoder 1015. The row decoder 1110 and the column decoder 1115 may be coupled to the controller 1102 that provides one or more control signals to the row decoder 1110 and/or the column decoder for identifying and accessing the at least one memory cell 1125.

The combination circuit 1120 may combine light signals (i.e., charges) captured by the pixels of the macropixel 1105 into a combined light signal (i.e., combined charge), which can be stored in the at least one identified memory cell 1125. The combination circuit 1120 may be an analog circuit that combines, e.g., voltage signals (or current signals) corresponding to captured charges into a single voltage signal (or current signal) that corresponds to the combined charge. The combination circuit 1120 may provide the combined signal to the at least one memory cell 1125 identified via the row decoder 1110 and/or the row decoder 1115.

The array of memory cells 1125 may store information about portions of the light pulses reflected from the target area. The array of memory cells 1125 as shown represents a two-dimensional array of memory cells (e.g., 8×16 array of memory cells), but in other embodiments may include some other number and/or array of memory cells. Each memory cell 1125 may include a charge based memory element configured to store information identifying an amount of light. A charge based memory element of a memory cell 1125 may comprise a charge sharing memory element configured to increment in fixed steps using, e.g., a fixed charge transfer function.

The controller 1102 may control operations of the row decoder 1110, the column decoder 1115, and/or the combination circuit 1120, e.g., by providing the one or more control signals. The controller 1102 may further determine depth information for the target area using data read from one or more memory cells 1125 identified based on the one or more control signals from the controller 1102. In the same way as the detector 700 includes the output bus 750, the multimode detector composed of the array of unit cells 1100 may further include an output bus (not shown in FIG. 11) configured to receive the data read from the one or more identified memory cells 1125. The controller 1102 may be common for each unit cell 1100 in the multimode detector, i.e., the multimode detector may include a single controller 1102 shared by all unit cells 1100. Alternatively, each unit cell 1100 may have its own controller 1102. Or a group of unit cells 1102 in the multimode detector may share the controller 1102. The controller 1102 may be coupled to the output bus and obtain the read data from the output bus. The output bus may be further coupled to an analog-to-digital converter (not shown in FIG. 11) configured to correct non-linearity in the fixed charge transfer function of charge sharing memory element(s) of the one or more identified memory cells 1125.

The row decoder 1110 may be coupled to a charge based memory element of each memory cell 1125 providing a reference timing signal to the charge based memory element. Similarly, the column decoder 1115 may be coupled to the charge based memory element of each memory cell 1125 providing another reference timing signal to the charge based memory element. Based on an activation state of the row decoder 1110 and an activation state of the column decoder 1115, the multimode detector (and the DCA) may operate in one of a direct time-of-flight (dTOF) mode, a photon-counting mode and an indirect time-of-flight (iTOF) mode for depth sensing of the target area.

Figure 12C:
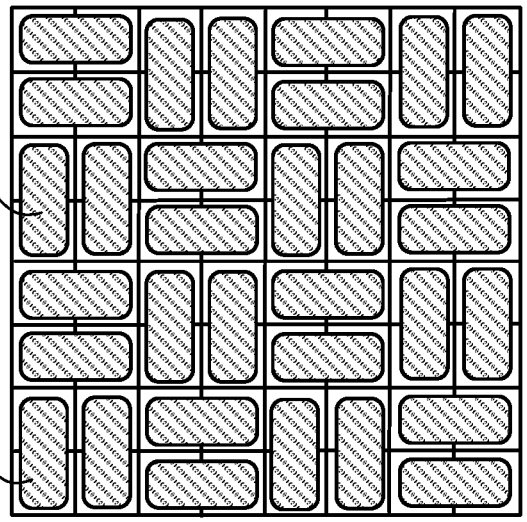
FIG. 12C illustrates an example resolution for an indirect time-of-flight based depth sensing, in accordance with one or more embodiments.

In one embodiment, the controller 1102 may activate the row decoder 1110 and the column decoder 1115 based on the one or more control signals, and thus configure the unit cell 1100 (as well as the multimode detector and the DCA) to operate in the dTOF mode. In the dTOF mode, the controller 1102 may further send the one or more control signals to the combination circuit 1120 to initiate combining captured portions of the reflected light pulses stored in the pixels of the macropixel 1105 into a combined charge. Additionally, the controller 1102 may initiate sending the combined charge to a charge based memory element of a corresponding memory cell 1125 addressed by the one or more control signals from the controller 1102. As the captured portions of the reflected light pulses stored in the pixels of the macropixel 1105 are combined into a single charge that is stored into the corresponding memory cell 1125, the effective resolution of unit cell 1100 when the multimode detector operates in the dTOF mode may be a single point resolution, as illustrated in FIG. 12A. A single resolution point 1205 in FIG. 12A illustrates that the captured portions of the reflected light pulses stored in the pixels of the macropixel 1105 are all combined into a single combined charge, which is further transferred to the charge based memory element of the corresponding memory cell 1125.

In another embodiment, the controller 1102 may deactivate the row decoder 1110 and the column decoder 1115 based on the one or more control signals, and thus configure the unit cell 1100 (as well as the multimode detector and the DCA) to operate in the photon-counting mode. In such case, the controller 1102 may initiate sending a captured portion of the reflected light pulses from each pixel of the macropixel 1105 to a respective subset of the memory cells 1125 (e.g., a respective column of memory cells 1125), based on the one or more control signals. Thus, in the photon-counting mode, each photon captured at the macropixel 1105 may be saved at the array of memory cells 1125 and be counted. In this mode, each memory cell 1125 may be connected to one pixel (e.g., one SPAD) in the macropixel 1105. Thus, there may be effectively more memory cells 1125 saving charges than pixels (e.g., SPADs) in the macropixel 1105. Portions of the reflected light pulses captured at the macropixel 1105 may be provided to a selected row of memory cells 1125.

Figure 12B:
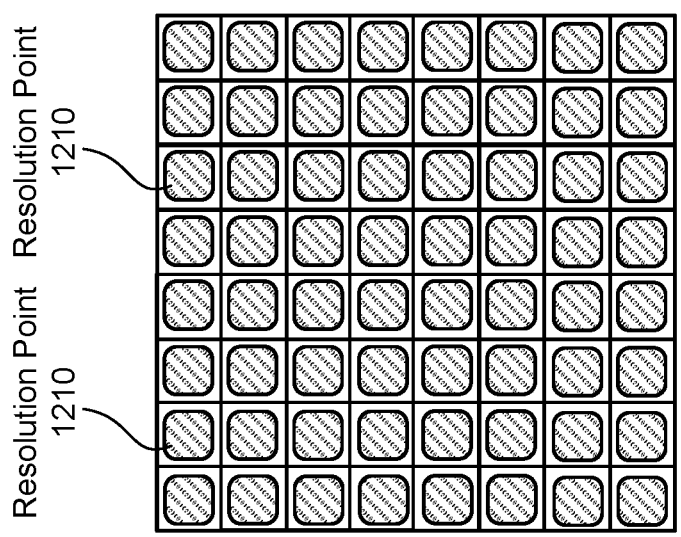
FIG. 12B illustrates an example resolution for a photon counting based depth sensing, in accordance with one or more embodiments.
Figure 12A:
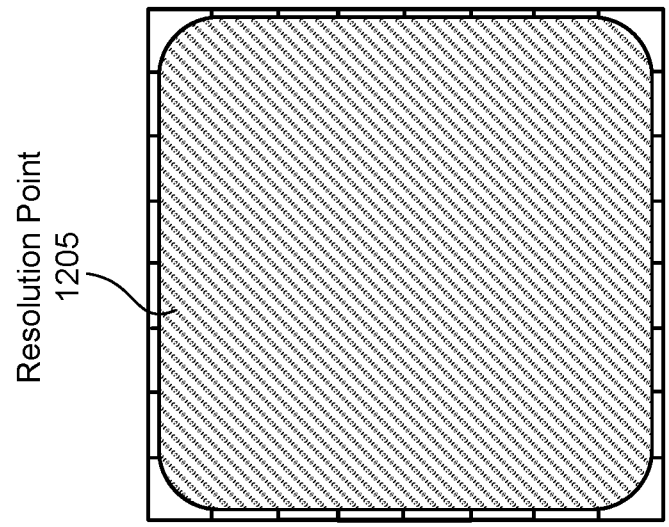
FIG. 12A illustrates an example resolution for a direct time-of-flight based depth sensing, in accordance with one or more embodiments.

As the captured portion of the reflected light pulses from each pixel of the macropixel 1105 may be stored in a corresponding memory cell 1125, the effective resolution of the unit cell 1100 when the multimode detector operates in the photon counting mode may be a native resolution of the macropixel 1105, as illustrated in FIG. 12B for the case when the macropixel 1105 includes an 8×8 array of pixels. Resolution points 1210 in FIG. 12B illustrate that each portion of the reflected light pulses captured at each pixel of the macropixel 1105 is independently preserved and later transferred to a charge based memory element of a respective memory cell 1125. The number of resolution points 1210 corresponds to the native resolution of the macropixel 1105, i.e., to the number of independently preserved photon counts at each pixel of the macropixel 1105.

In yet another embodiment, the controller 1102 may deactivate the row decoder 1110 or the column decoder 1115 based on the one or more control signals, and thus configure the unit cell 1100 (as well as the multimode detector and the DCA) to operate in the iTOF mode. In such case, the controller 1102 may initiate sending captured portions of the reflected light pulses from the pixels of the macropixel 1105 to at least one row of the memory cells 1125 or at least one column of the memory cells 1125 in accordance with reference timing signals provided to the at least one row via the row decoder 1110 or to the at least one column via the column decoder 1115. Depending on a number of pixels (e.g., SPADs) in the macropixel 1105 and available memory cells 1125, the maximum resolution of the unit cell 1100 when the multimode detector operates in the iToF mode can be defined.

In one or more embodiment, as shown in FIG. 12C, the effective resolution of the unit cell 1100 when the multimode detector operates in the iToF mode may be reduced (e.g., by half) relative to the native resolution of the photon counting mode (e.g., see FIG. 12B), but may be substantially higher than the single point resolution of the dToF mode (e.g., see FIG. 12A). Resolution points 1215 in FIG. 12C illustrate that portions of the reflected light pulses captured at pairs of adjacent pixels in the macropixel 1105 are combined (e.g., by the combination circuit 1120) into a corresponding charge, before transferring that charge to a charge based memory element of a corresponding memory cell 1125. The number of resolution points 1215 thus corresponds to a half of the native resolution of the macropixel 1105. In the iTOF mode, the association (or grouping) of pixels in the macropixel 1105 may be arbitrary. The grouping of pixels may depend on the number of available memory cells 1125 in the unit cell 1100. If there is a sufficient number of memory cells 1125 relative to the number of pixels in the macropixel 1105 (e.g., at least between two and four times more memory cells 1125 than pixels in the macropixel 1105), the native resolution of the macropixel 1105 can be retained in the iTOF mode.

Figure 13:
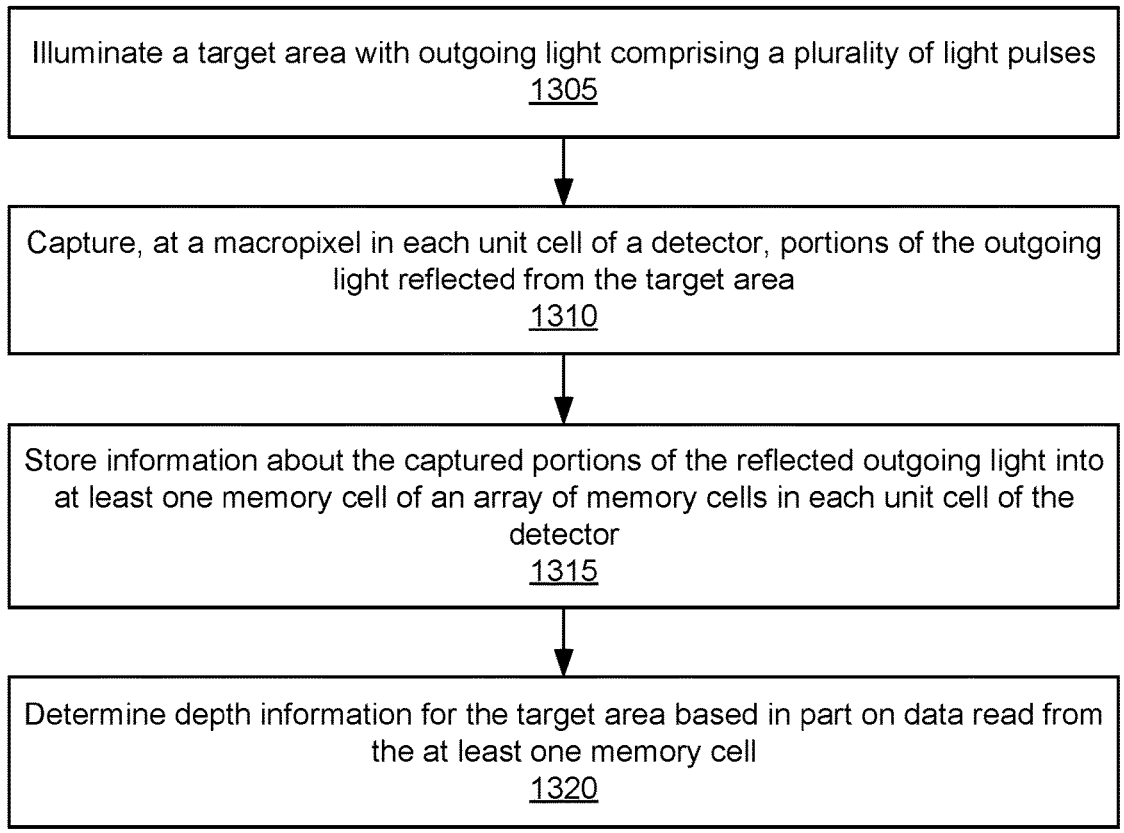
FIG. 13 is a flow chart illustrating a process of time-of-flight (ToF) based depth sensing, in accordance with one or more embodiments.

FIG. 13 is a flow chart illustrating a process 1300 of ToF based depth sensing at a multimode detector, in accordance with one or more embodiments. The process 1300 of FIG. 13 may be performed by components of the multimode detector (e.g., a multimode detector composed of an array of unit cells 1100) and components of the DCA, e.g., the DCA 340. Other entities may perform some or all of the steps of the process in other embodiments. Likewise, embodiments may include different and/or additional steps, or perform the steps in different orders.

The DCA illuminates 1305 (e.g., via the illumination source 350) a target area with outgoing light comprising a plurality of light pulses. In some embodiments, the plurality of light pulses comprise a structured light pattern (e.g., dot pattern). The DCA may be part of a headset (e.g., HMD 110), and the plurality of light pulses may illuminate the target area that includes a local area surrounding at least a portion of the headset.

The DCA captures 1310, at a macropixel (e.g., the macropixel 1105) in each unit cell (e.g., the unit cell 1100) of the detector, portions of the outgoing light reflected from the target area. The macropixel may include a plurality of pixels, and each pixel of the macropixel may include a charge based memory element configured to store information identifying an amount of light. The charge based memory element of each pixel may be associated with a capture bin having, e.g., an adjustable time duration. The DCA may generate (e.g., via a controller) one or more capturing instructions based on information about a distance from the detector to the target area. The DCA may adjust (e.g., via the controller) the time duration of the capture bin in accordance with the one or more capturing instructions.

The DCA stores 1315 information about the captured portions of the reflected outgoing light into at least one memory cell of an array of memory cells (e.g., the array of memory cells 1125) in each unit cell of the detector. The DCA may provide (e.g., via the controller) a reference timing signal to a charge based memory element of each memory cell via a row decoder coupled to the charge based memory element. The DCA may provide (e.g., via the controller) another reference timing signal to the charge based memory element via a column decoder to the charge based memory element. Based in part on an activation state of the row decoder and an activation state of the column decoder, the DCA may be configured to operate in one of a dTOF mode, a photon-counting mode and an iTOF mode.

In one or more embodiments, the DCA activates (e.g., via the controller) the row decoder and the column decoder, and configures the dTOF mode of depth sensing. In the dTOF mode, the DCA may combine (e.g., via the combination circuit 1120) the captured portions of the reflected outgoing light stored in the pixels of the macropixel (e.g., the macropixel 1105) into a combined charge. And the DCA may send the combined charge to a charge based memory element of a corresponding memory cell of the array of memory cells. In one or more other embodiments, the DCA deactivates (e.g., via the controller) the row decoder or the column decoder, and configures the iTOF mode of depth sensing. In the iTOF mode, the DCA may send the captured portions of the reflected outgoing light from the pixels of the macropixel to at least one row of the memory cells or at least one column of the memory cells in accordance with reference timing signals provided to the at least one row or the at least one column via the row decoder or the column decoder. In one or more other embodiments, the DCA deactivates (e.g., via the controller) the row decoder and the column decoder, and configures the photon-counting mode of depth sensing. In the photon-counting mode, the DCA may send a captured portion of the reflected outgoing light from each pixel of the macropixel to a respective subset of the memory cells.

The DCA determines 1320 (e.g., via the controller) depth information for the target area based in part on data read from the at least one memory cell. In the dTOF mode, the DCA may determine (e.g., via the controller) the depth information for the target area based in part on the data read from the corresponding memory cell. In the iToF mode, the DCA may determine (e.g., via the controller) the depth information for the target area based in part on the data read from the at least one row or the at least one column of the memory cells. In the photon-counting mode, the DCA may determine (e.g., via the controller) the depth information for the target area based in part on the data read from the respective subset of the memory cells.

The multimode detector may further include an output bus for reception of the data read from each charge based memory element in each of the at least one memory cell. Each charge based memory element may comprise a charge sharing memory element configured to increment in fixed steps using a fixed charge transfer function. The output bus may be coupled to an analog-to-digital converter for correcting non-linearity in the fixed charge transfer function.

Depth Sensing with Variable Bin Widths

As aforementioned, each pixel in the macropixel 1105 (or macropixel 705, or macropixel 1000) may include a charge based memory element configured to store information identifying an amount of light. The charge based memory element may be associated with a capture bin representing a capturing time during which light may be captured and stored in the charge based memory element. In some embodiments, a capture bin of a charge based memory element of each pixel in the macropixel 1105 (or macropixel 705, or macropixel 1000) has an adjustable time duration (i.e., a bin width may be variable). The controller 1102 (or controller 360) may generate capturing instructions based on information about a distance from the multimode detector (or detector 700) to the target area. The controller 1102 (or controller 360) may adjust the time duration of the capture bin in accordance with the capturing instructions. By applying the variable (adjustable) bin widths, saturation of pixels that correspond to portions of the target area that are closer than a threshold distance from the multimode detector (or detector 700) may be avoided by making capture bins for these pixels shorter in time relative to capture bins for remaining pixels.

Figure 14A:
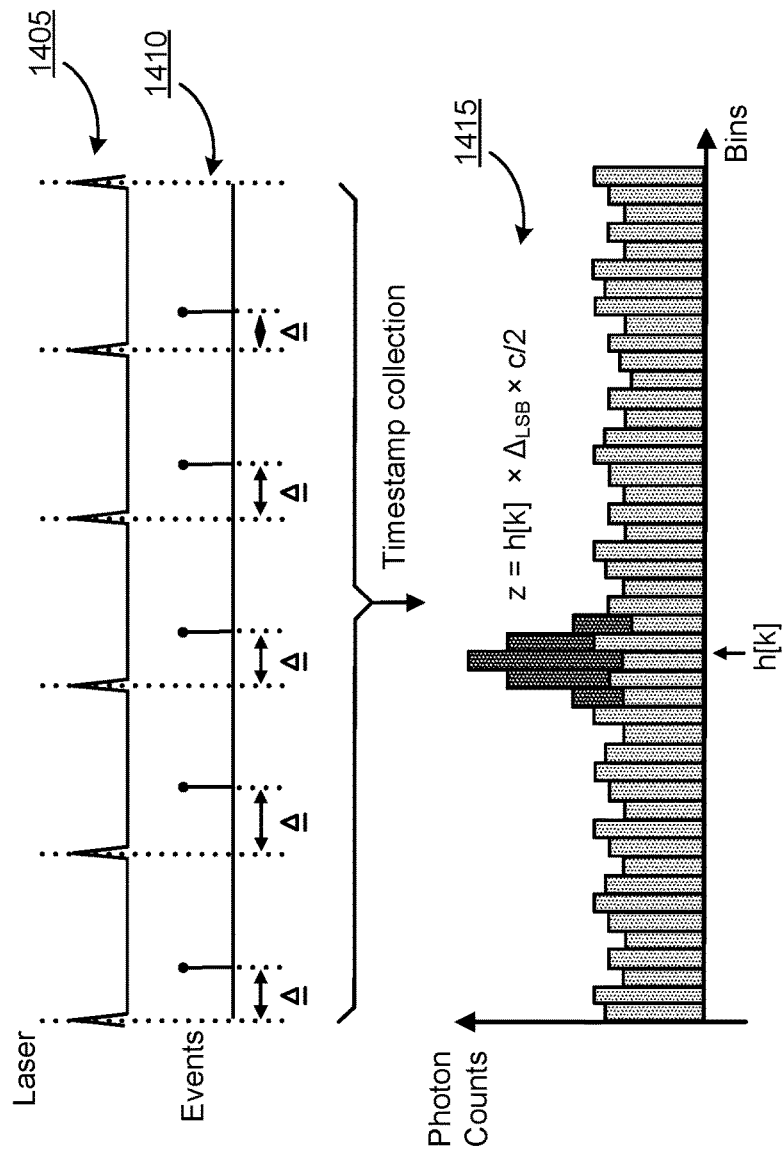
FIG. 14A illustrates example diagrams of light emission and collection events applied for ToF based depth sensing, in accordance with one or more embodiments.

FIG. 14A illustrates example diagrams of light emission and collection events applied for ToF based depth sensing, in accordance with one or more embodiments. A diagram 1405 illustrates an example emission of light pulses from one laser (e.g., VCSEL) in an array of lasers (e.g., VCSEL array) of a projector (e.g., the illumination source 350) that illuminate a portion of the target area. A diagram 1410 may illustrate collection events at pixels of the macropixel 1105, and each collection event has a respective delay A relative to a peak of respective light pulse emitted from the laser. A diagram 1415 illustrates photon counts for different capture bins of the pixels. A distance to the portion of the target area (i.e., depth z) may be determined as $h[k]\Delta_{LSB} c/2$, where $h[k]$ is a histogram bin in which the photon count peak is located, $\Delta_{LSB}$ is a histogram bin resolution related to a least significant bit (LSB) of a timing reference, and c is the speed of light (e.g., approximately $3\cdot10^8$ m/s). As the measured distance to the portion of the target area is smaller, the photon count peak of $h[k]$ becomes higher and may cause saturation at a corresponding pixel when the photon count peak is greater than a saturation threshold of the pixel, thus causing an erroneous measurement of the distance (i.e., depth z).

Figure 14B:
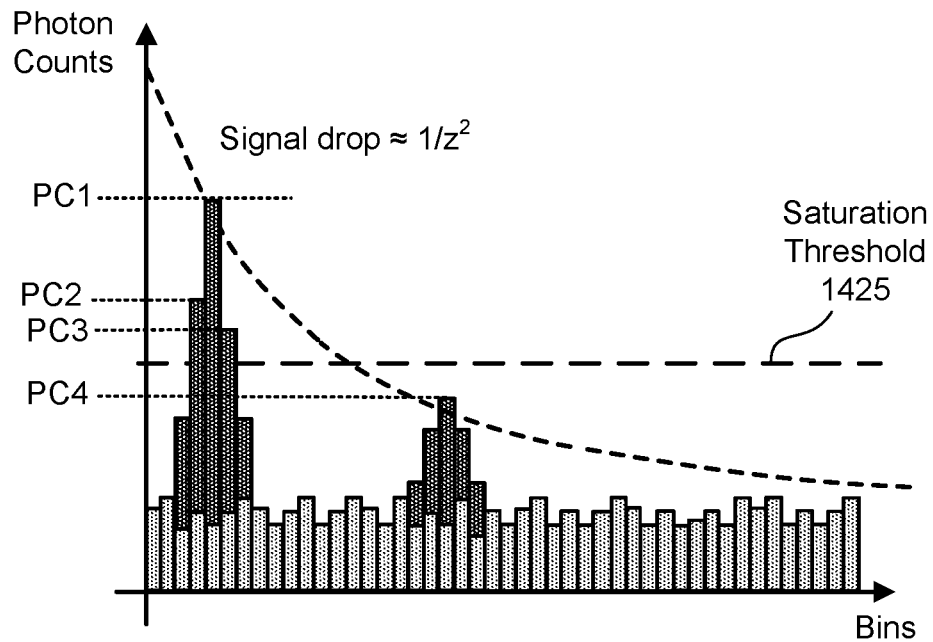
FIG. 14B illustrates an example graph of histogram bins when a fixed bin width is used for ToF based depth sensing, in accordance with one or more embodiments.
Figure 14C:
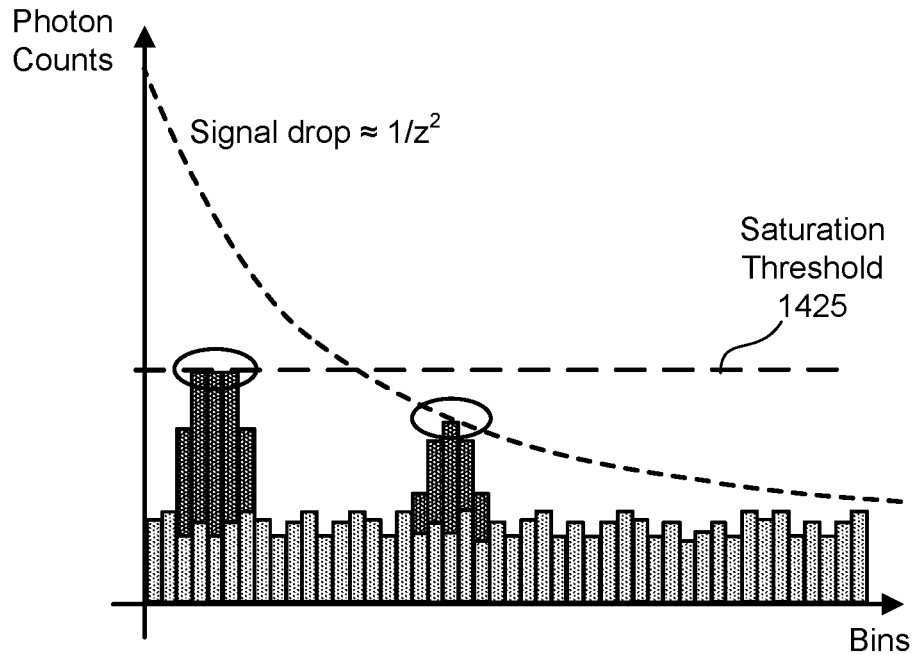
FIG. 14C illustrates an example graph of saturated histogram bins when a fixed bin width is used for ToF based depth sensing, in accordance with one or more embodiments.

FIG. 14B illustrates an example graph 1420 of histogram bins when a fixed bin width is used for ToF based depth sensing, in accordance with one or more embodiments. FIG. 14C illustrates an example graph 1430 of saturated histogram bins when a fixed bin width is used for ToF based depth sensing, in accordance with one or more embodiments. It can be observed from the graph 1420 that at least three photon count peaks (referred to respectively as PC1, PC2, and PC3) corresponding to a near distance portion of the target area may be greater than a saturation threshold 1425, which causes memory saturation at corresponding pixels and limits photon counts, as shown in FIG. 14C. As an intensity of captured light signals drops approximately as an inverse quadratic function of a distance (i.e., depth z) from a corresponding portion of the target area, a photon count peak PC4 corresponding to, e.g., a further distance portion of the target area is still smaller than the saturation threshold 1425, and no saturation occurs at a corresponding pixel (as also shown in FIG. 14C). Thus, as shown in FIGS. 14B-14C, under a fixed bin width approach, the saturation and clipping may occur at one or more pixels (e.g., especially for a near distance portion of a target area), which increases an error in depth sensing measurements.

Figure 15A:
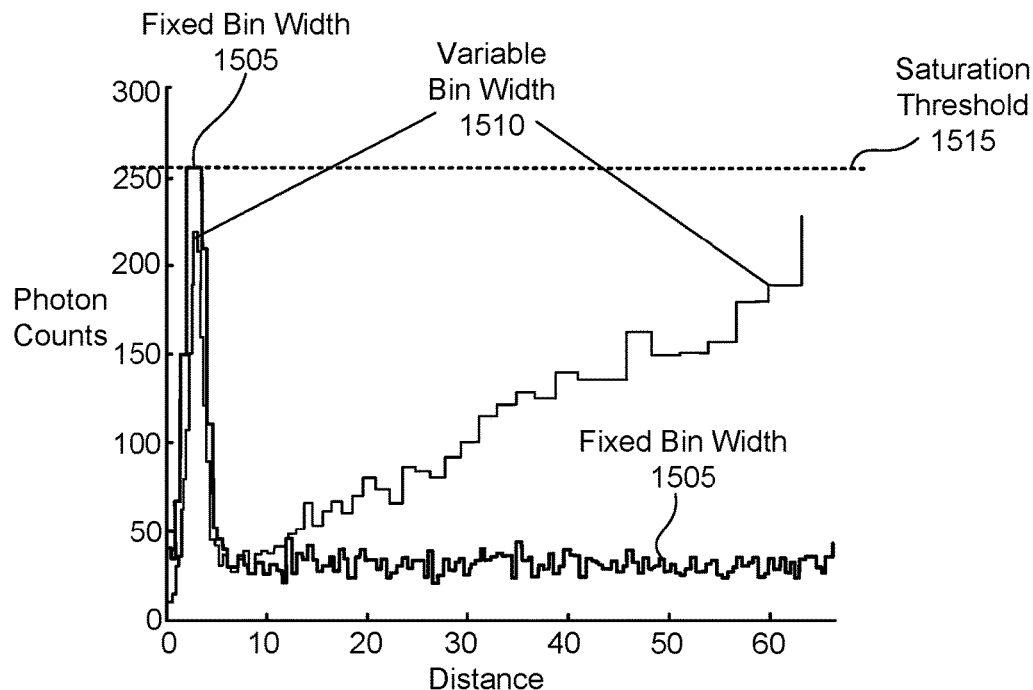
FIG. 15A illustrates example graph of ToF based depth sensing for fixed and variable bin widths, in accordance with one or more embodiments.

FIG. 15A illustrates example graph 1500 of ToF based depth sensing for fixed and variable bin widths, in accordance with one or more embodiments. It can be observed from a fixed bin width diagram 1505 that saturation may occur for a near distance portion of a target area, i.e., one or more photon counts of the diagram 1505 corresponding to one or more distances may be limited to a saturation threshold 1515. In contrast, it can be observed from a variable bin width diagram 1510 that no saturation occurs. This is because bin widths corresponding to smaller distances are shorter (i.e., bins have shorter durations) and corresponding photon counts of the of the diagram 1510 do not reach the saturation threshold 1515. And bin widths corresponding to larger distances are longer (i.e., bins have longer durations), which does not case saturation as captured light signals drop as a quadratic function of the distance. Bins with longer durations for larger distances facilitate higher accuracy of depth sensing as more photons are captured over a longer time duration.

Figure 15B:
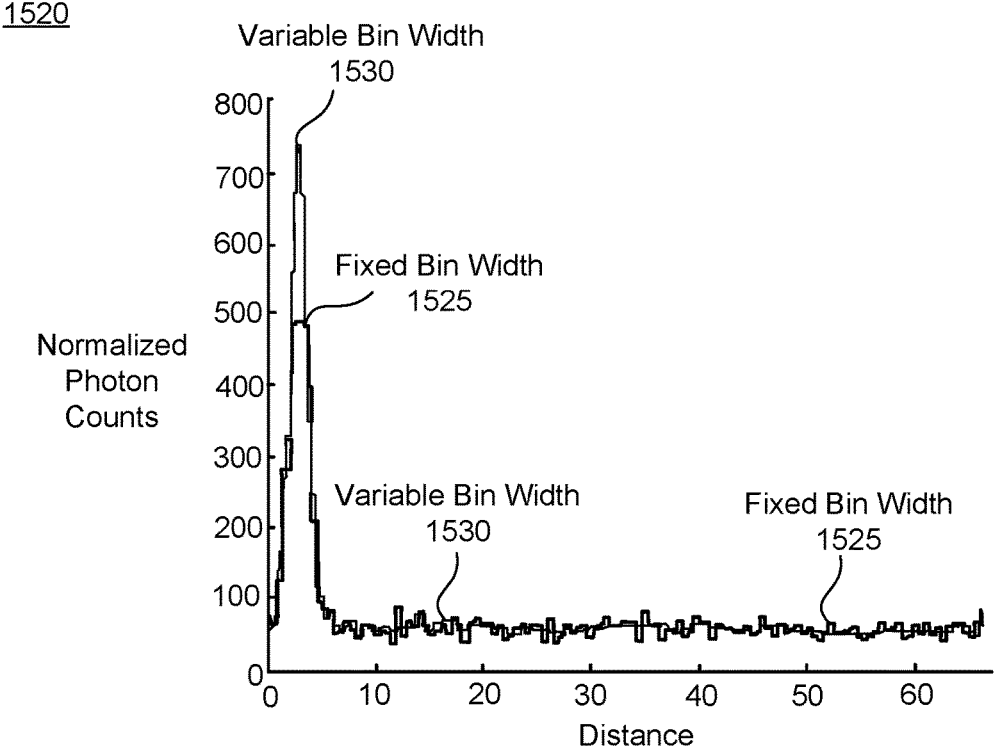
FIG. 15B illustrates example graph of ToF based depth sensing for fixed and variable bin widths after normalization by a bin width, in accordance with one or more embodiments.

FIG. 15B illustrates example graph 1520 of ToF based depth sensing for fixed and variable bin widths after normalization by a bin width, in accordance with one or more embodiments. A diagram 1525 shows normalized photon counts as a function of distance for a fixed bin width, and a diagram 1530 shows normalized photon counts as a function of distance for variable bin widths. It can be observed that a higher relative resolution can be achieved by applying variable bin widths, especially for smaller distances as the normalized photon counts of the diagram 1525 for variable bin widths can be higher for smaller distances than the normalized photon counts of the diagram 1525 for the fixed bin width.

Control of Illumination Power

Figure 16A:
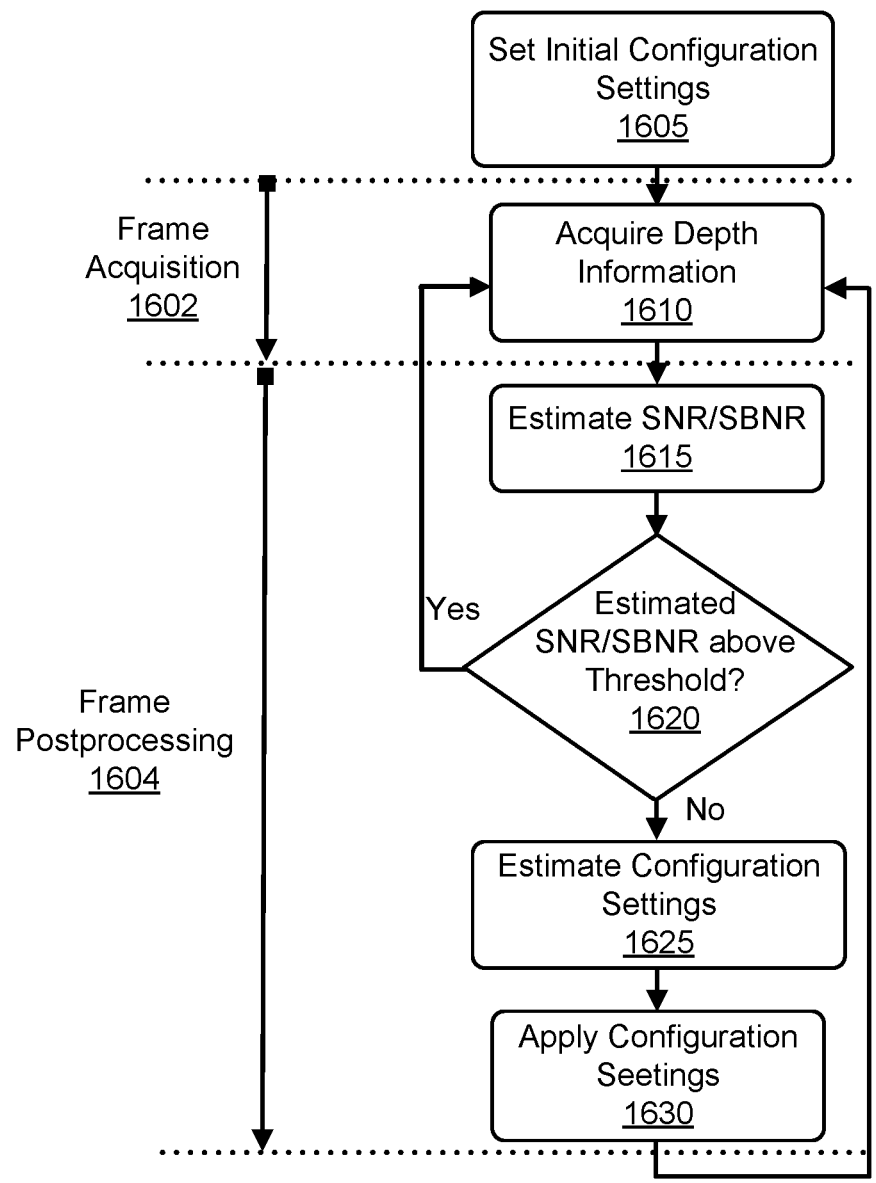
FIG. 16A illustrates an example algorithm for controlling the number of light pulses emitted from a DCA, in accordance with one or more embodiments.

FIG. 16A illustrates an example algorithm 1600 for controlling the number of light pulses emitted from a DCA (e.g., the DCA 340), in accordance with one or more embodiments. At 1605, initial configuration settings may be set for a plurality of lasers (all VCSELs in the VCSEL array) in a projector (e.g., the illumination source) of the DCA. The configuration settings may control an illumination power for each laser, a timing window during which each laser is active, or some combination thereof. In one embodiment, at 1605, the plurality of lasers may be set to maximum defined illumination power. For example, the plurality of lasers may emit light pulses at a same amplitude and a maximum defined number of pulses (e.g., 6000 pulses) over a predetermined time period. At 1610, during a frame acquisition 1602, the DCA may acquire depth information, e.g., via a detector, such as the detector 700 or the multimode detector having the array of unit cells 1100. The detector may detect pulses of light reflected from the target area at, e.g., the macropixels 705, macropixels 1000, or unit cells 1100. A controller of the DCA (e.g., the controller 360 or the controller 1102) may determine depth information for the target area using e.g., ToF based depth sensing. At 1615, a frame postprocessing 1604 begins, and the controller may estimate a SNR and/or a signal-to-background noise ratio (SBNR) for each macropixel or unit cell. The controller may estimate the SNR and/or SBNR for each macropixel or unit cell by, e.g., analyzing the determined depth information.

At 1620, the controller may determine whether the estimated SNR/SBNR is above defined threshold value(s). In one embodiment, by achieving that the SNR/SBNR is above defined threshold value(s), the illumination power associated with the plurality of lasers of the projector is at a preferred level (e.g., optimized). The controller may determine what portions of the depth information have the unsatisfactory SNR/SBNR (e.g., SNR/SBNR below defined threshold value(s)). As each macropixel or unit cell has a different corresponding group of VCSELs from which the macropixel or unit cell detects light, the controller may tune the SNR/SBNR for different portions of the target area by adjusting the number of pulses that are sent to that portion of the target area and control when the corresponding macropixels or unit cells are active for that portion of the target area. In instances where the plurality of lasers were at the maximum illumination power, objects are very close, objects have high reflectance, or some combination thereof, it is likely that the macropixels or unit cells would receive too much signal and saturate—thereby negatively affecting depth information. In cases where the SNR/SBNR are satisfactory (e.g., SNR/SBNR above the defined threshold value(s))) for the entire target area—the algorithm 1600 moves back to step 1610, i.e., to a new frame acquisition 1602. However, in cases where an adjustment to the number of emitted light pulses still needs to be made, the algorithm 1600 moves forward to step 1625 and the frame postprocessing 1604 continues.

At 1625, the controller may estimate the configuration settings for the plurality of lasers. In this step, for macropixels or unit cells that do not have optimum SNR/SBNR, the controller may reduce (or increase) the number of light pulses to adjust the illumination power for one or more lasers. For example, if a macropixel or unit cell associated with a particular laser (e.g., VCSEL) is saturated, the controller may update the emission instructions for this laser such that the laser emits fewer light pulses. The controller may also update the timing window(s) such that the one or more lasers are active for more or less time.

At 1630, the configuration settings may be applied for the plurality of lasers. In one embodiment, at 1630, the illumination power for the plurality of lasers may be set. The controller may then instruct the projector to illuminate the target area using updated emission instructions. The controller may also instruct the detector to adjust when macropixels or unit cells are active in accordance with the updated timing windows. The algorithm 1600 may then move back to step 1610, i.e., to a new frame acquisition 1602.

Figure 16B:
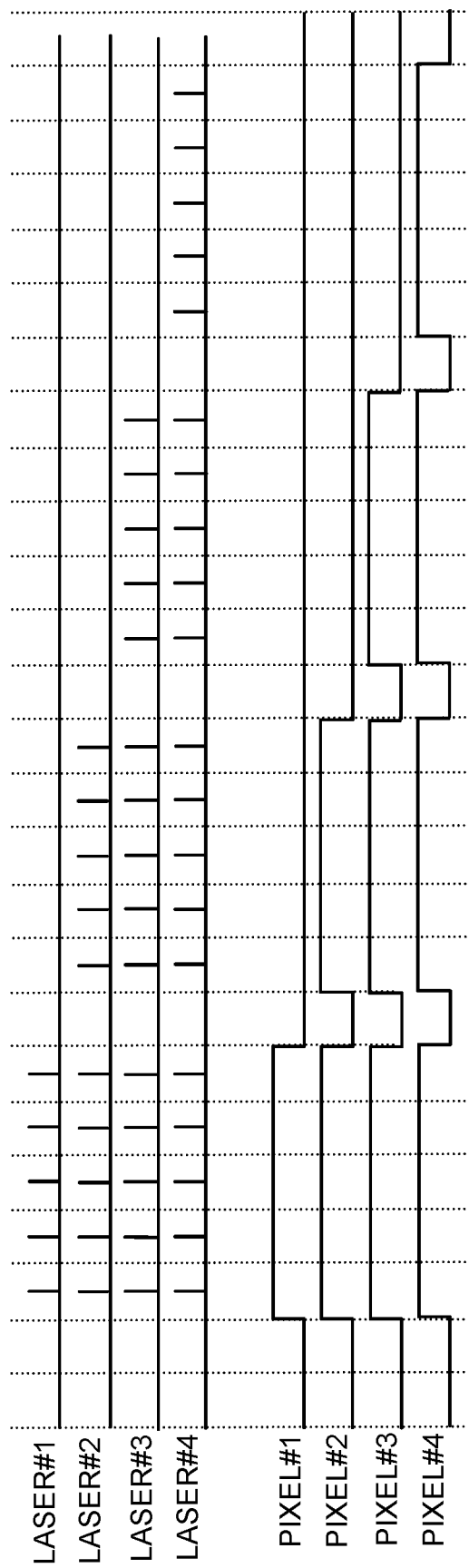
FIG. 16B illustrates an example timing diagram for controlling the number of light pulses emitted from a DCA, in accordance with one or more embodiments.

FIG. 16B illustrates an example timing diagram 1650 for controlling the number of light pulses emitted from the DCA, in accordance with one or more embodiments. Timing diagrams laser #1, laser #2, laser #3, laser #4 show light pulses respectively sent by laser 1 (e.g., a first VCSEL), laser 2 (e.g., a second VCSEL), laser 3 (e.g., a third VCSEL), and laser 4 (e.g., a fourth VCSEL) of the projector over time. Each timing diagram pixel #1, pixel #2, pixel #3, pixel #4 shows when a respective pixel (e.g., from the macropixel 705, the macropixel 1000, or the macropixel 1105) is active for capturing reflected light emitted from a respective laser 1-4. For example, as shown in FIG. 16A, pixel 1 may capture a set of light pulses reflected from the target area that were emitted from laser 1 over a first timing window (e.g., over a first exposure interval associated with pixel 1). Pixel 1 may become inactive after the first exposure interval, as the estimated SNR/SBNR for pixel 1 is satisfactory (e.g., above a threshold level) and timing windows for laser 1 may be updated accordingly so that laser 1 also becomes inactive after the first exposure interval. In contrast, pixel 4 may capture four sets of pulses of light reflected from the target area that were emitted from laser 4 over four corresponding timing windows (e.g., four exposure intervals associated with pixel 4). As, for example, pixel 4 may be associated with a far portion of a target area, the estimated SNR/SBNR for pixel 4 may not be satisfactory (e.g., the estimated SNR/SBNR for pixel 4 is below the threshold level) even after three of four exposure intervals. Thus, timing windows for laser 4 may be updated accordingly so that laser 4 is still active even after the three or four exposure intervals.

Figure 17:
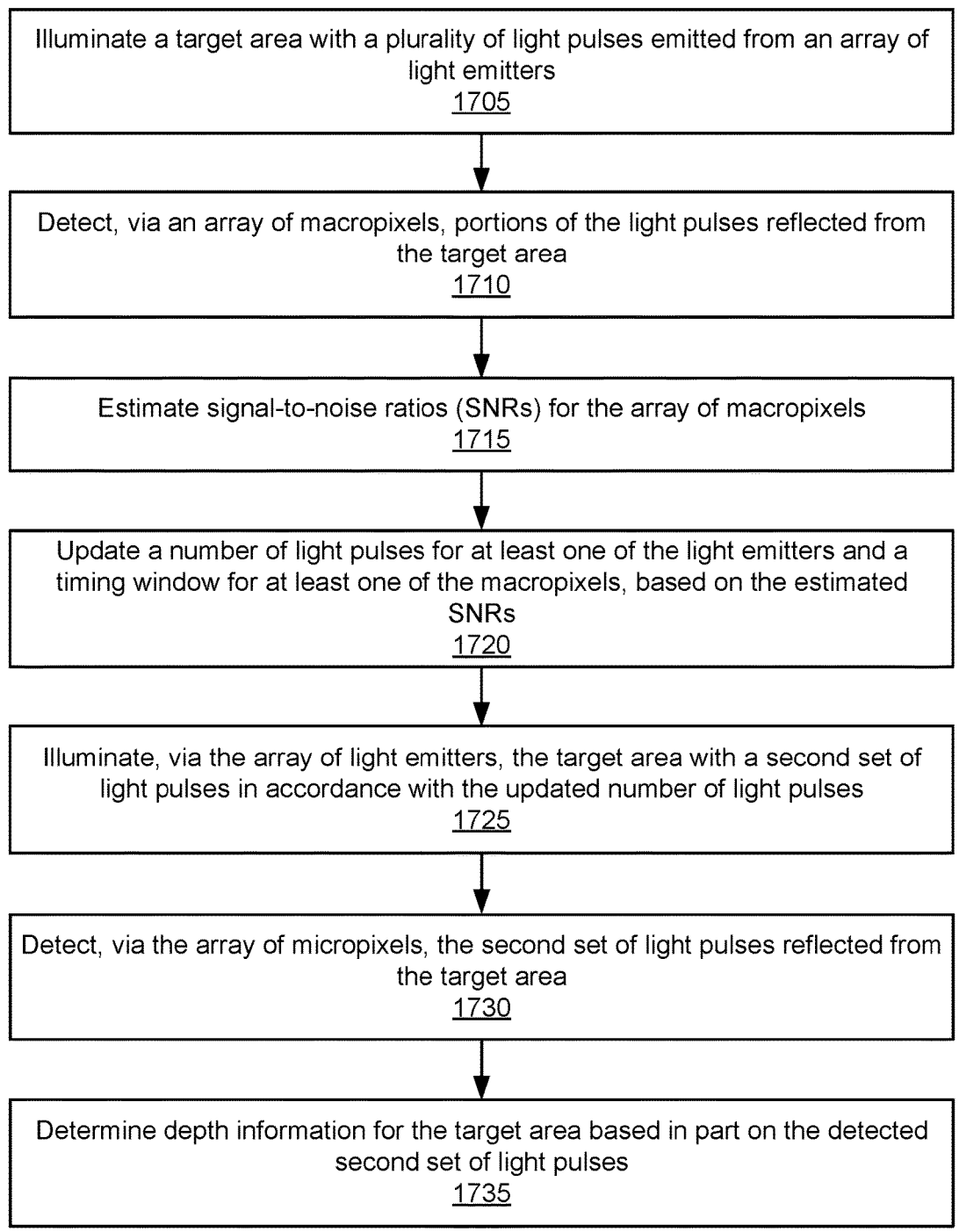
FIG. 17 is a flow chart illustrating a process of optimizing the number of light pulses emitted from a DCA, in accordance with one or more embodiments.

FIG. 17 is a flow chart illustrating a process 1700 of optimizing the number of light pulses emitted from a DCA, in accordance with one or more embodiments. The process 1700 of FIG. 17 may be performed by one or more components of the DCA, e.g., the DCA 340. Other entities may perform some or all of the steps of the process in other embodiments. Likewise, embodiments may include different and/or additional steps, or perform the steps in different orders.

The DCA illuminates 1705 (e.g., via the illumination source 350) a target area with a plurality of light pulses emitted from an array of light emitters. Each light emitter in the array may output a corresponding number of light pulses to a respective portion of the target area. The DCA may be part of a headset (e.g., HMD 110), and the plurality of light pulses may illuminate the target area that includes a local area surrounding at least a portion of the headset.

The DCA detects 1710, via an array of macropixels (e.g., macropixels 705, macropixels 1000, or macropixels 1105), portions of the light pulses reflected from the target area. Each macropixel in the array may capture light over one or more respective timing windows from one or more different light emitters of the array of light emitters.

The DCA estimates 1715 (e.g., via the controller 360 or the controller 1102) a respective SNR for each macropixel in the array. Hence, the DCA may estimate a set of SNRs for the array of macropixels.

The DCA updates 1720 (e.g., via the controller 360 or the controller 1102) the number of light pulses for at least one of the light emitters and a timing window for at least one of the macropixels, based on the estimated SNRs.

The DCA illuminates 1725, via the array of light emitters (e.g., of the illumination source 350), the target area with a second set of light pulses in accordance with the updated number of light pulses. The at least one light emitter may output the updated number of light pulses.

The DCA detects 1730, via the array of macropixels (e.g., macropixels 705, macropixels 1000, or macropixels 1105), the second set of light pulses reflected from the target area. The at least one macropixel may capture light over a different timing window.

The DCA determines 1735 (e.g., via the controller 360 or the controller 1102) depth information for the target area based in part on the detected second set of light pulses.

The DCA presented herein may be integrated into a headset as part of an AR system. In this case, the headset may be configured to sense and display objects behind a head of a user wearing the headset or display objects recorded previously. Alternatively, the DCA may be integrated into a base station or a sensor bar external to the headset. In this case, the DCA may be configured to sense various body parts of a user wearing the headset or portions of an environment, e.g., for recording the geometry of a user or a local area, hand-tracking, eye-tracking, face recognition, gesture recognition, environment scanning, environment reconstruction, etc. In some embodiments, the DCA is integrated into a portable computing platform (e.g., a mobile phone or tablet).

In some other embodiments, the DCA presented herein is part of an eye tracker, and light from the DCA illuminates a target area that includes an eye box of a headset. An imaging device of the eye tracker captures one or more images of at least a portion of the light reflected from at least one surface of an eye in the eye box. A controller of the eye tracker determines position and orientation of the eye in the eye box (e.g., gaze direction for eye) based on the captured one or more images.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a projector configured to illuminate a target area with outgoing light comprising a plurality of light pulses;
a detector comprising an array of unit cells, each unit cell including:
a macropixel having a plurality of pixels configured to capture portions of the outgoing light reflected from the target area, and
an array of memory cells coupled to the macropixel, at least one memory cells configured to store information about the captured portions of the reflected outgoing light received from the macropixel; and
one or more access circuits that comprise:
a row decoder coupled to a charge based memory element of each memory cell providing a reference timing signal to the charge-based memory element; and
a column decoder coupled to the charge based memory element of each memory cell providing another reference timing signal to the charge-based memory element, wherein the row decoder and the column decoder are selectively activated or deactivated based at least in part on a desired resolution of the unit cell; and
a controller configured to provide one or more control signals to the detector identifying the at least one memory cell to determine depth information for the target area based in part on data read from the at least one memory cell.

2. The DCA of claim 1, wherein the charge based memory element is associated with a capture bin having an adjustable time duration.

3. The DCA of claim 2, wherein the controller is further configured to:
generate one or more capturing instructions based on information about a distance from the detector to the target area; and
adjust the time duration of the capture bin in accordance with the one or more capturing instructions.

4. The DCA of claim 1, wherein the DCA is configured to operate in one of a direct time-of-flight (dTOF) mode, a photon-counting mode and an indirect time-of-flight (iTOF) mode for determination of the depth information, based in part on an activation state of the row decoder and an activation state of the column decoder.

5. The DCA of claim 4, wherein the controller is further configured to:
activate the row decoder and the column decoder for configuring the DCA to operate in the dTOF mode;
initiate combining the captured portions of the reflected outgoing light stored in the plurality of pixels of the macropixel into a combined charge;
initiate sending the combined charge to a charge based memory element of a corresponding memory cell in the array of memory cells, based on the one or more control signals; and
determine the depth information for the target area based in part on the data read from the corresponding memory cell.

6. The DCA of claim 4, wherein the controller is further configured to:
deactivate the row decoder or the column decoder based on the one or more control signals for configuring the DCA to operate in the iTOF mode;
initiate sending the captured portions of the reflected outgoing light from the plurality of pixels of the macropixel to at least one row of the memory cells or at least one column of the memory cells in accordance with reference timing signals provided to the at least one row or the at least one column via the row decoder or the column decoder; and
determine the depth information for the target area based in part on the data read from the at least one row or the at least one column of the memory cells.

7. The DCA of claim 4, wherein the controller is further configured to:
deactivate the row decoder and the column decoder based on the one or more control signals for configuring the DCA to operate in the photon-counting mode;
initiate sending a captured portion of the reflected outgoing light from each pixel of the macropixel to a respective subset of the memory cells, based on the one or more control signals; and
determine the depth information for the target area based in part on the data read from the respective subset of the memory cells.

8. The DCA of claim 1, wherein the detector further comprises an output bus configured to receive the data read from each charge based memory element in each of the at least one memory cell.

9. The DCA of claim 8, wherein each charge based memory element comprises a charge sharing memory element configured to increment in fixed steps using a fixed charge transfer function, and the output bus is coupled to an analog-to-digital converter configured to correct non-linearity in the fixed charge transfer function.

10. The DCA of claim 1, wherein the DCA is part of a headset and the plurality of light pulses from the projector illuminate the target area that includes a local area surrounding at least a portion of the headset.

11. A method comprising:
illuminating a target area with outgoing light comprising a plurality of light pulses;
capturing, at a macropixel in each unit cell of a detector, portions of the outgoing light reflected from the target area, the macropixel comprising a plurality of pixels;
storing information about the captured portions of the reflected outgoing light into at least one memory cell of an array of memory cells in each unit cell of the detector; and determining depth information for the target area based in part on data read from the at least one memory cell, wherein the depth information is determined at least in in part by:
providing a reference timing signal to a charge based memory element of each memory cell via a row decoder coupled to the charge based memory element;
providing another reference timing signal to the charge based memory element via a column decoder coupled to the charge based memory element;
configuring the detector to operate in one of a direct time-of-flight (dTOF) mode, a photon-counting mode and an indirect time-of-flight (iTOF) mode for determination of the depth information, based in part on an activation state of the row decoder and an activation state of the column decoder.

12. The method of claim 11, wherein each charge based memory element is associated with a capture bin having an adjustable time duration, and the method further comprising:
generating one or more capturing instructions based on information about a distance from the detector to the target area; and
adjusting the time duration of the capture bin in accordance with the one or more capturing instructions.

13. The method of claim 11, further comprising:
activating the row decoder and the column decoder for configuring the dTOF mode;
combining the captured portions of the reflected outgoing light stored in the plurality of pixels of the macropixel into a combined charge;
sending the combined charge to a charge based memory element of a corresponding memory cell of the array of memory cells; and
determining the depth information for the target area based in part on the data read from the corresponding memory cell.

14. The method of claim 11, further comprising:
deactivating the row decoder or the column decoder for configuring the iTOF mode;
sending the captured portions of the reflected outgoing light from the plurality of pixels of the macropixel to at least one row of the memory cells or at least one column of the memory cells in accordance with reference timing signals provided to the at least one row or the at least one column via the row decoder or the column decoder; and
determining the depth information for the target area based in part on the data read from the at least one row or the at least one column of the memory cells.

15. The method of claim 11, further comprising:
deactivating the row decoder and the column decoder for configuring the photon-counting mode;
sending a captured portion of the reflected outgoing light from each pixel of the macropixel to a respective subset of the memory cells; and determining the depth information for the target area based in part on the data read from the respective subset of the memory cells.

16. The method of claim 11, further comprising:
illuminating the target area with the light pulses emitted from an array of light emitters, each light emitter outputs a corresponding number of light pulses to a respective portion of the target area;
detecting, via an array of macropixels of the detector, portions of the light pulses reflected from the target area, each macropixel captures light over one or more respective timing windows from one or more different light emitters of the array of light emitters;
estimating signal-to-noise ratios (SNRs) for the array of macropixels;
updating a number of light pulses for at least one of the light emitters and a timing window for at least one of the macropixels, based on the estimated SNRs;
illuminating, via the array of light emitters, the target area with a second set of light pulses in accordance with the updated number of light pulses,
wherein the at least one light emitter outputs the updated number of light pulses;
detecting, via the array of macropixels, the second set of light pulses reflected from the target area, wherein the at least one macropixel captures light over a different timing window; and determining the depth information for the target area based in part on the detected second set of light pulses.

17. A detector comprising:
an array of unit cells, each unit cell including:
a macropixel having a plurality of pixels configured to capture portions of outgoing light reflected from a target area,
an array of memory cells configured to store information about the captured portions of the reflected outgoing light received from the macropixel, and
one or more access circuits configured to receive one or more control signals identifying at least one of the memory cells; and
an output bus configured to receive a data read from each charge based memory element in each of the at least one memory cell and wherein each charge based memory element comprises a charge sharing memory element configured to increment in fixed steps using a fixed charge transfer function, and the output bus is coupled to an analog-to-digital converter configured to correct non-linearity in the fixed charge transfer function; and
a controller configured to:
provide the one or more control signals to the one or more access circuits, and
determine depth information for the target area based in part on data read from the at least one identified memory cell.

18. The detector of claim 17, wherein the controller is shared by all unit cells in the array.

19. The detector of claim 17, wherein the controller is allocated to one unit cell in the array.

* * * * *